United States Patent
Kuramura et al.

(10) Patent No.: US 10,255,327 B2
(45) Date of Patent: Apr. 9, 2019

(54) APPARATUS AND METHOD FOR PROVIDING CONTACT-RELATED INFORMATION ITEMS

(71) Applicant: Nokia Technologies Oy, Espoo (FI)

(72) Inventors: Don Yamato Kuramura, Redondo Beach, CA (US); Bryan Thomas Biniak, Pacific Palisades, CA (US); Peter Matthew Mauro, Los Angeles, CA (US); Roope Rainisto, Helsinki (FI); Melanie Wendland, Berlin (DE)

(73) Assignee: NOKIA TECHNOLOGY OY, Espoo (FI)

( * ) Notice: Subject to any disclaimer, the term of this patent is extended or adjusted under 35 U.S.C. 154(b) by 95 days.

(21) Appl. No.: 13/774,748

(22) Filed: Feb. 22, 2013

(65) Prior Publication Data

US 2014/0244630 A1    Aug. 28, 2014

(51) Int. Cl.
G06F 17/30        (2006.01)
G06Q 50/00      (2012.01)

(52) U.S. Cl.
CPC ......... *G06F 17/3053* (2013.01); *G06Q 50/01* (2013.01)

(58) Field of Classification Search
CPC ......... G06F 17/30864; G06F 17/30867; G06F 17/30675; G06F 17/30696; G06F 17/3028; G06F 17/30643; G06Q 30/02
See application file for complete search history.

(56) References Cited

U.S. PATENT DOCUMENTS 5,923,327 A *  7/1999  Smith et al. .................. 715/784
6,353,664 B1   3/2002  Cannon et al.
6,606,381 B1   8/2003  Wunsch
6,687,362 B1   2/2004  Lindquist et al.
7,289,772 B1 * 10/2007  Bonansea et al. .............. 455/73
7,844,671 B1  11/2010  Lawler et al.
(Continued)

FOREIGN PATENT DOCUMENTS

CN    102393843    3/2012
CN    102497333    6/2012
(Continued)

OTHER PUBLICATIONS

HTC One X How-tos > Receiving calls; retrieved on Jan. 28, 2013 from <www.htc.com/help/www/howto_iframe.aspx?id=141714&type=1&p_id=440>.

(Continued)

*Primary Examiner* — James Trujillo
*Assistant Examiner* — Jessica N Le
(74) *Attorney, Agent, or Firm* — Alston & Bird LLP

(57) ABSTRACT

Mechanisms are provided for determining contact-related information items for presentation to a user, such that the user can refer to the information items to enhance the user's communication with the contact. Contact-related information items that have a high relevance level may be accessed and presented to the user. In a case in which no or limited high relevance level information items exist, contact-related information items associated with incrementally lower levels of relevance may be accessed and presented. Moreover, according to some example embodiments, relevance may be derived based on the relationship of the user with the particular contact and/or the frequency of communications with the contact.

17 Claims, 18 Drawing Sheets

(56) References Cited

U.S. PATENT DOCUMENTS

| | | | |
|---|---|---|---|
| 8,014,760 B2 | 9/2011 | Forstall et al. | |
| 8,064,888 B2 | 11/2011 | Lee | |
| 8,135,389 B2 | 3/2012 | Forstall et al. | |
| 8,150,431 B2* | 4/2012 | Wolovitz et al. | 455/466 |
| 8,160,222 B2 | 4/2012 | White et al. | |
| 8,170,588 B2 | 5/2012 | Tamchina et al. | |
| RE43,613 E | 8/2012 | Kinoshita | |
| 8,311,580 B2 | 11/2012 | Koberg et al. | |
| 8,331,916 B2 | 12/2012 | Martin et al. | |
| 8,572,191 B2 | 10/2013 | Bonforte | |
| 8,577,895 B2 | 11/2013 | Gupta et al. | |
| 8,775,526 B2* | 7/2014 | Lorch et al. | 709/206 |
| 9,413,866 B2 | 8/2016 | Kraft et al. | |
| 2004/0067768 A1 | 4/2004 | King et al. | |
| 2004/0073565 A1* | 4/2004 | Kaufman et al. | 707/101 |
| 2004/0119761 A1 | 6/2004 | Grossman et al. | |
| 2004/0215793 A1* | 10/2004 | Ryan et al. | 709/229 |
| 2005/0114796 A1* | 5/2005 | Bast | 715/856 |
| 2005/0198131 A1 | 9/2005 | Appelman et al. | |
| 2006/0029202 A1 | 2/2006 | Koskela | |
| 2006/0085415 A1 | 4/2006 | Jian | |
| 2006/0195534 A1* | 8/2006 | Isozaki et al. | 709/206 |
| 2007/0033210 A1 | 2/2007 | Baudino et al. | |
| 2007/0265828 A1* | 11/2007 | Lorraine Scott | G06F 17/289 704/9 |
| 2007/0266156 A1* | 11/2007 | Wilkins | 709/225 |
| 2008/0005263 A1 | 1/2008 | Baraev et al. | |
| 2008/0055263 A1 | 3/2008 | Lemay et al. | |
| 2008/0091653 A1 | 4/2008 | Jamison et al. | |
| 2008/0140785 A1 | 6/2008 | Farrenkopf et al. | |
| 2009/0055379 A1 | 2/2009 | Murtagh | |
| 2009/0063521 A1* | 3/2009 | Bull et al. | 707/100 |
| 2009/0086720 A1 | 4/2009 | Westlake | |
| 2009/0094559 A1 | 4/2009 | Shoshan | |
| 2009/0136013 A1* | 5/2009 | Kuykendall et al. | 379/142.17 |
| 2009/0202059 A1 | 8/2009 | Sharma | |
| 2009/0209240 A1 | 8/2009 | Mahowald | |
| 2010/0042941 A1 | 2/2010 | Vance et al. | |
| 2010/0050086 A1 | 2/2010 | Sherrard et al. | |
| 2010/0057643 A1 | 3/2010 | Yang | |
| 2010/0062753 A1* | 3/2010 | Wen et al. | 455/418 |
| 2010/0144323 A1 | 6/2010 | Collins et al. | |
| 2010/0235886 A1 | 9/2010 | Muller et al. | |
| 2010/0241664 A1 | 9/2010 | Levasseur et al. | |
| 2010/0274847 A1 | 10/2010 | Anderson et al. | |
| 2010/0274852 A1 | 10/2010 | Anderson et al. | |
| 2010/0306185 A1* | 12/2010 | Smith et al. | 707/709 |
| 2010/0330967 A1 | 12/2010 | Chiu et al. | |
| 2011/0038470 A1 | 2/2011 | Kent | |
| 2011/0076989 A1 | 3/2011 | Lynch | |
| 2011/0087747 A1 | 4/2011 | Hirst et al. | |
| 2011/0129077 A1 | 6/2011 | Prakash et al. | |
| 2011/0130958 A1 | 6/2011 | Stahl et al. | |
| 2011/0137881 A1* | 6/2011 | Cheng | G06F 17/3087 707/706 |
| 2011/0196876 A1 | 8/2011 | Seeger et al. | |
| 2011/0274257 A1 | 11/2011 | Vaananen | |
| 2011/0288868 A1 | 11/2011 | Lloyd et al. | |
| 2012/0054631 A1* | 3/2012 | Nurmi et al. | 715/744 |
| 2012/0110032 A1* | 5/2012 | Robison | G06Q 30/02 707/812 |
| 2012/0110096 A1* | 5/2012 | Smarr | H04W 4/21 709/206 |
| 2012/0150970 A1* | 6/2012 | Peterson | G06F 3/04817 709/206 |
| 2012/0196581 A1* | 8/2012 | Papakipos | H04L 51/046 455/415 |
| 2012/0204113 A1 | 8/2012 | Shiplacoff et al. | |
| 2012/0214456 A1 | 8/2012 | Cho et al. | |
| 2012/0233274 A1 | 9/2012 | Salpietro et al. | |
| 2012/0245944 A1 | 9/2012 | Gruber et al. | |
| 2012/0311584 A1 | 12/2012 | Gruber et al. | |
| 2012/0315880 A1 | 12/2012 | Peitrow et al. | |
| 2013/0054617 A1* | 2/2013 | Colman | G06F 17/3089 707/748 |
| 2013/0111356 A1* | 5/2013 | Vasudevan et al. | 715/753 |
| 2013/0144682 A1 | 6/2013 | Dhara et al. | |
| 2013/0185670 A1* | 7/2013 | Liu | G06Q 50/01 715/781 |
| 2013/0191416 A1* | 7/2013 | Lee | G06F 17/30979 707/771 |
| 2013/0198811 A1* | 8/2013 | Yu | H04L 63/104 726/4 |
| 2013/0217365 A1 | 8/2013 | Ramnani | |
| 2013/0218902 A1* | 8/2013 | Vendrow | G06F 17/30867 707/748 |
| 2013/0339345 A1* | 12/2013 | Soto Matamala | G06F 17/3089 707/722 |
| 2014/0164504 A1* | 6/2014 | Dellenbach et al. | 709/204 |
| 2014/0187208 A1* | 7/2014 | De Oliveira et al. | 455/412.1 |
| 2014/0244616 A1 | 8/2014 | Kuramura et al. | |
| 2014/0245180 A1 | 8/2014 | Kuramura et al. | |

FOREIGN PATENT DOCUMENTS

| | | |
|---|---|---|
| CN | 102624958 | 8/2012 |
| CN | 102822811 | 12/2012 |
| CN | 102904797 | 1/2013 |
| CN | 102930362 | 2/2013 |
| CN | 102938805 | 2/2013 |
| EP | 0498997 | 8/1992 |
| EP | 1774764 | 4/2007 |
| EP | 2060096 A1 | 5/2009 |
| WO | WO-2008/030778 A1 | 3/2008 |
| WO | WO-2012/127807 A1 | 9/2012 |

OTHER PUBLICATIONS

International Search Report and Written Opinion for Application No. PCT/IB2014/059097; dated May 9, 2014.

International Search Report and Written Opinion for Application No. PCT/IB2014/059100; dated Apr. 22, 2014.

International Search Report and Written Opinion for Application No. PCT/IB2014/059131; dated May 2, 2014.

Notice from the European Patent Office dated Oct. 1, 2007 concerning business methods; Office Journal of the European Patent Office, vol. 30, No. 11; pp. 592-593; dated Nov. 2007; XP007905525.

Bihler, P., et al., *Seamless Cross-Application Workflow Support by User Interface Fusion*; [online][Retrieved May 15, 2013] Retrieved from: <URL http://www.iai.uni-bonn.de/~gk/papers/bihlerKniesel-uifusion-uuid2007.pdf> (dated Mar. 28-30, 2007).

Mudar, E., *Incoming Call UI Improvement*; [online][Retrieved May 15, 2013] Retrieved from: <URL: https://ideasproject.com/idea/-/ideas/633590;jsessionid=6BDA11DA191B11427178462D07855289> (dated Oct. 12, 2011).

Sage, S., *Current Caller ID — Would You Like Some Facebook Status with That Incoming Call?*, [online][Retrieved May 15, 2013] Retrieved from: <URL: http://www.androidcentral.com/current-caller-id> undated.

*Callapp Contacts Social Dialer*, [online][Retrieved May 15, 2013] Retrieved from: <URL: https://play.google.com/store/apps/details?id=com.callapp.contacts> (dated Jan. 23, 2013).

*Cloze*, [online][Retrieved May 15, 2013] Retrieved from: <URL: https://www.cloze.com/> undated.

*Current Caller ID*, [online][Retrieved May 15, 2013] Retrieved from: <URL: https://play.google.com/store/apps/details?id=com.webascender.callerid> (dated: Aug. 8, 2012).

*HTC One X How-TOS*, [online][Retrieved May 15, 2013] Retrieved from: <URL http://www.htc.com/www/?aspxerrorpath=/help/www/howto_iframe.aspx> undated.

*Mingly*, [online][Retrieved May 15, 2013] Retrieved from: <URL: https://ming.ly/> undated.

*Rapportive*, [online][Retrieved May 15, 2013] Retrieved from: <URL: http://rapportive.com/> undated.

*Smarter by Xonbi*, [online][Retrieved May 15, 2013] Retrieved from: <URL: https://www.xobni.com/> undated.

(56) References Cited

OTHER PUBLICATIONS

*WhitePages Combines Free Social, Call and Text ID Into Single App to Foster Better Communications*, [online][Retrieved May 15, 2013] Retrieved from: <URL: http://www.marketwire.com/press-release/whitepages-combines-free-social-call-text-id-into-single-app-foster-better-communications-1688402.htm> (dated Aug. 8, 2012).
*Windows Phone People Hub*, [online][Retrieved May 15, 2013] Retreived from: <URL: http://www.windowsphone.com/en-us/how-to/wp7/people/people-hub> undated.
Office Action from U.S. Appl. No. 13/774,645, dated Sep. 29, 2014.
Office Action for U.S. Appl. No. 13/774,712 dated Mar. 25, 2015.
Office Action for U.S. Appl. No. 13/774,712 dated Aug. 17, 2015.
Office Action for U.S. Appl. No. 13/774,645 dated Sep. 23, 2015.
*Inside Search: "Now on tap" to help you with what you need in the moment anywhere on your phone* [online] [retrieved Oct. 5, 2015]. Retrieved from the Internet: <URL: http://insidesearch.blogspot.co.uk/2015/05/now-on-tap.html>. (dated May 28, 2015) 5 pages.
Office Action for U.S. Appl. No. 13/774,712 dated Jun. 1, 2016.
Office Action for U.S. Appl. No. 13/774,645 dated Feb. 26, 2016.
Decision on Appeal for U.S. Appl. No. 13/774,645 dated Jun. 8, 2017.
Office Action for U.S. Appl. No. 13/774,645 dated Jul. 28, 2017, 20 pages.
Office Action from U.S. Appl. No. 13/774,645, dated May 18, 2018.
Office Action from corresponding Chinese Application No. 201480020709.6, dated Apr. 4, 2018, with English Summary, 12 pages.
Office Action from European Application No. 14710056.4, dated Apr. 4, 2018, 5 pages.
Office Action from U.S. Appl. No. 13/774,645, dated Nov. 30, 2018.

\* cited by examiner

APPARATUS AND METHOD FOR PROVIDING CONTACT-RELATED INFORMATION ITEMS

TECHNOLOGICAL FIELD

Example embodiments of the present invention relate generally to facilitating communication between users of devices and their contacts. In particular, example embodiments of the present invention provide contact-related information items for presentation to a user.

BACKGROUND

Advancements in communications technology have allowed people to connect and communicate with each other in numerous ways. People are able to call each other, send messages (e.g., text messages, instant messages, and email messages), post files, links, and comments on social media websites, blogs, and other websites for others to see, and exchange data in other ways using their devices.

Although these advancements may have increased our ability to establish a technological connection with others, many still find it difficult to effectively communicate with others.

Accordingly, it may be desirable to provide tools that allow users of communication devices to communicate more easily and on a more personal, human level with their contacts.

BRIEF SUMMARY OF EXAMPLE EMBODIMENTS

Accordingly, embodiments of an apparatus, method, and computer program product are described that can provide the user with contact-related information items based on a relevance level of the information item with respect to the contact for reference and use before, during, and/or after communications with the contact. In particular, embodiments of an apparatus for providing contact-related information items based on relevance may include at least one processor and at least one memory including computer program code. The at least one memory and the computer program code may be configured to, with the processor, cause the apparatus to at least determine whether a contact-related information item associated with a first relevance level is available. In an instance in which the contact-related information item associated with the first relevance level is available, the at least one memory and the computer program code may be configured to, with the processor, cause the apparatus to provide for presentation of the contact-related information item associated with the first relevance level. In an instance in which the contact-related information item associated with the first relevance level is unavailable, the at least one memory and the computer program code may be configured to, with the processor, cause the apparatus to access a contact-related information item associated with a second relevance level and provide for presentation of the contact-related information item associated with the second relevance level, wherein the second relevance level is lower than the first relevance level.

At least one of the first relevance level or the second relevance level may be predefined. Additionally or alternatively, at least one of the first relevance level or the second relevance level may be based at least in part on input provided by the user. In some cases, at least one of the first relevance level or the second relevance level may be based at least in part on input provided by the contact.

The contact-related information item associated with the first relevance level may comprise contact-specific data. The at least one memory and the computer program code may be further configured to, with the processor, cause the apparatus to provide for presentation of the contact-related information item by displaying the contact-related information item within a predefined display area associated with a communication opportunity.

In an instance in which the predefined display area is incomplete, the at least one memory and the computer program code may be further configured to, with the processor, cause the apparatus to determine at least one additional contact-related information item. In an instance in which an additional contact-related information item associated with the first relevance level is unavailable, the at least one memory and the computer program code may be further configured to, with the processor, cause the apparatus to access a contact-related information item associated with the second relevance level and to provide for presentation of the contact-related information item associated with the second relevance level within the predefined area. Furthermore, the at least one memory and the computer program code may be further configured to, with the processor, cause the apparatus to determine whether a contact-related information item associated with the first relevance level is available in response to at least one of receipt of an incoming communication opportunity associated with the contact or receipt of a user request.

In other embodiments, a method and a computer program product are described for providing contact-related information items based on relevance by determining whether a contact-related information item associated with a first relevance level is available. In an instance in which the contact-related information item associated with the first relevance level is available, the method and computer program product may include providing for presentation of the contact-related information item associated with the first relevance level. In an instance in which the contact-related information item associated with the first relevance level is unavailable, the method and computer program product may include accessing a contact-related information item associated with a second relevance level and providing for presentation of the contact-related information item associated with the second relevance level, wherein the second relevance level is lower than the first relevance level.

At least one of the first relevance level or the second relevance level may be predefined. Alternatively or additionally, at least one of the first relevance level or the second relevance level may be based at least in part on input provided by the user or input provided by the contact.

In some cases, the contact-related information item associated with the first relevance level may comprise contact-specific data. Furthermore, providing for presentation of the contact-related information item may comprise displaying the contact-related information item within a predefined display area associated with a communication opportunity. In an instance in which the predefined display area is incomplete, the method and computer program product may further comprise determining at least one additional contact-related information item. In an instance in which an additional contact-related information item associated with the first relevance level is unavailable, the method and computer program product may further comprise accessing a contact-related information item associated with the second relevance level and providing for presentation of the contact-related information item associated with the second relevance level within the predefined area. Furthermore, whether a contact-related information item associated with the first relevance level is available may be determined in response to at least one of receipt of an incoming communication opportunity associated with the contact or receipt of a user request.

In still other embodiments, an apparatus is described for providing contact-related information items based on relevance. The apparatus includes means for determining whether a contact-related information item associated with a first relevance level is available; means for providing for presentation of the contact-related information item associated with the first relevance level in an instance in which the contact-related information item associated with the first relevance level is available; and means for accessing a contact-related information item associated with a second relevance level and for providing for presentation of the contact-related information item associated with the second relevance level in an instance in which the contact-related information item associated with the first relevance level is unavailable, wherein the second relevance level is lower than the first relevance level.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
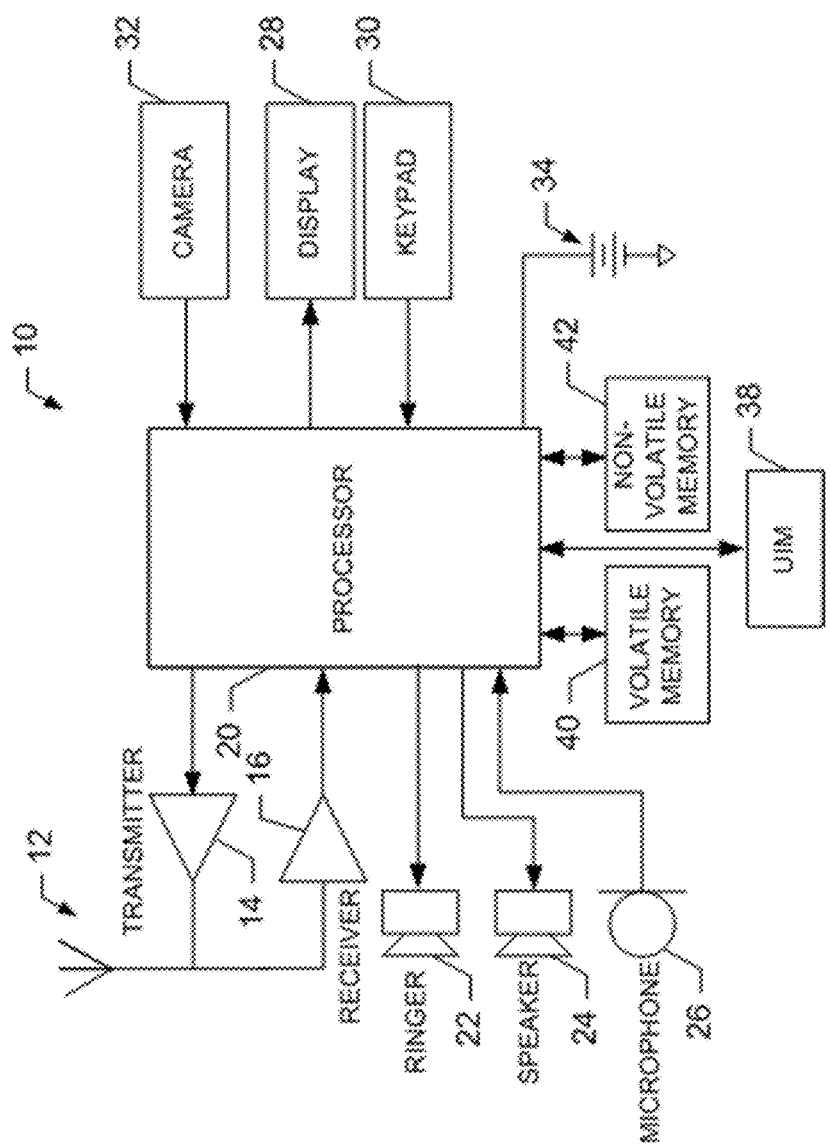
FIG. 1 illustrates one example of a communication system according to an example embodiment of the present invention.

Some example embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), can be differentiated from a "computer-readable transmission medium," which refers to an electromagnetic signal.

As noted above, technology has made it easier, in many ways, to exchange information with others. People can send each other messages, files, links, and other data in an instant with the touch of a screen, anytime, anywhere.

At the same time, servers are overflowing with information about the people users communicate with (e.g., their contacts). Information is posted on social media websites such as Facebook, Twitter, LinkedIn, Foursquare, Yelp, Sina-Weibo, and other websites by the contacts themselves describing what they like and don't like, their families, what they are experiencing, and what they think about certain topics. The user may have notes about a particular contact from their own knowledge of the contact, such as the contact's interests, the names of their family members, favorite sports teams, birthdays, anniversaries, place of work, etc. Past communications between a user and a particular contact may also provide insight into the contact's life and the contact's relationship with the user. For example, a user's spouse or child may be a contact with whom the user has frequent communications, whereas a contact the user met at an industry convention a year ago may be associated with much less frequent communications. Moreover, the context of the communication (e.g., day of the week, time of day the communication occurred, the length of the communication, keywords in the content of the communication, the type of communication, etc.) may provide valuable information regarding the contact and the nature of the contact's relationship with the user.

Accordingly, example embodiments of the present invention provide for mechanisms for determining contact-related information items for presentation to a user, such that the user can refer to the information items to enhance the user's communication with the contact. Contact-related information items that have a high relevance level may be accessed (e.g., from a social media website) and presented to the user (e.g., in a contact profile). In a case in which no or limited high relevance level information items exist (e.g., the contact has no associations with any social media websites), contact-related information items associated with incrementally lower levels of relevance may be accessed and presented. Moreover, according to some example embodiments, relevance may be derived based on the relationship of the user with the particular contact and/or the frequency of communications with the contact.

FIG. 1, which provides one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch screen display (display 28 providing an example of such a touch screen display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch screen display, as described further below, may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element 32 in order to capture images or video of objects, people, and places proximate to the user of the mobile terminal 10. The mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, which depicts certain elements of an apparatus 50 for providing contact-related information items for presentation to a user. The apparatus 50 of FIG. 2 may be employed, for example, with the mobile terminal 10 of FIG. 1. However, it should be noted that the apparatus 50 of FIG. 2 may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer, a tablet, a mobile telephone, or other user terminal. Moreover, in some cases, part or all of the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
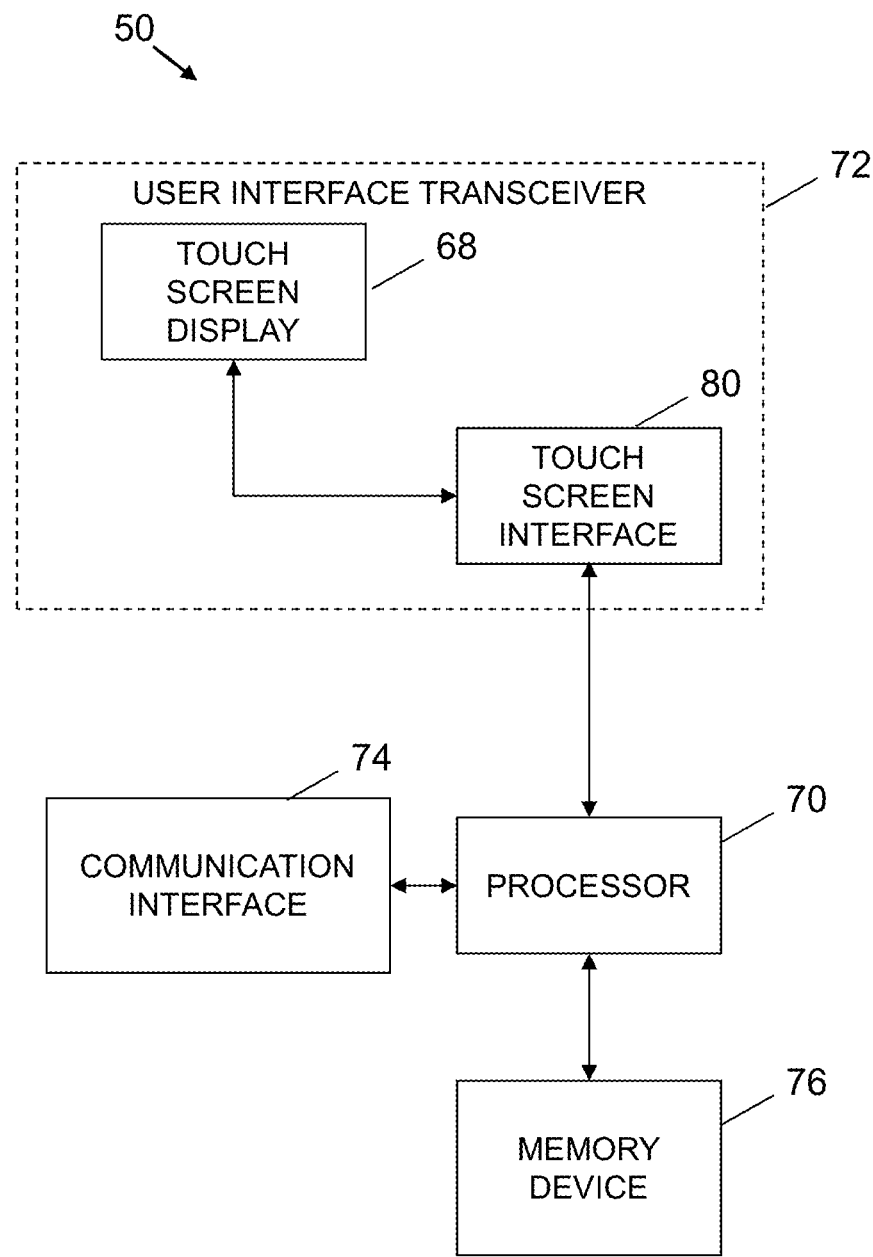
FIG. 2 illustrates a schematic block diagram of an apparatus for providing contact-related information items according to an example embodiment of the present invention.

It should also be noted that while FIG. 2 illustrates one example of a configuration of an apparatus for providing contact-related information items for presentation to a user, numerous other configurations may also be used to implement embodiments of the present invention. As such, in some embodiments, although devices or elements are shown as being in communication with each other, hereinafter such devices or elements should be considered to be capable of being embodied within a same device or element and, thus, devices or elements shown in communication should be understood to alternatively be portions of the same device or element.

Referring now to FIG. 2, the apparatus 50 for providing contact-related information items for presentation to a user may include or otherwise be in communication with a processor 70, a user interface transceiver 72, a communication interface 74, and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, content, applications, instructions, or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. Additionally or alternatively, the communication interface 74 may include the circuitry for interacting with the antenna(s) to cause transmission of signals via the antenna(s) or to handle receipt of signals received via the antenna(s). In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface transceiver 72 may be in communication with the processor 70 to receive an indication of a user input and/or to cause provision of an audible, visual, mechanical or other output to the user. As such, the user interface transceiver 72 may include, for example, a keyboard, a mouse, a joystick, a display, a touch screen(s), touch areas, soft keys, a microphone, a speaker, or other input/output mechanisms. Alternatively or additionally, the processor 70 may comprise user interface circuitry configured to control at least some functions of one or more user interface elements such as, for example, a speaker, ringer, microphone, display, and/or the like. The processor 70 and/or user interface circuitry comprising the processor 70 may be configured to control one or more functions of one or more user interface elements through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 could be configured to enable touch recognition by any suitable technique, such as resistive, capacitive, infrared, strain gauge, surface wave, optical imaging, dispersive signal technology, acoustic pulse recognition, and/or other techniques. The user interface transceiver 72 may be in communication with the touch screen display 68 to receive touch inputs at the touch screen display 68 and to analyze and/or modify a response to such indications based on corresponding user actions that may be inferred or otherwise determined responsive to the touch inputs.

With continued reference to FIG. 2, in an example embodiment, the apparatus 50 may include a touch screen interface 80. The touch screen interface 80 may, in some instances, be a portion of the user interface transceiver 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an input in the form of a touch event at the touch screen display 68. As such, the touch screen interface 80 may be in communication with the touch screen display 68 to receive user inputs at the touch screen display 68 and to modify a response to such inputs based on corresponding user actions that may be inferred or otherwise determined responsive to the inputs. Following recognition of a touch event, the touch screen interface 80 may be configured to determine a classification of the touch event and provide a corresponding function based on the touch event in some situations.

Figure 3:
FIG. 3 illustrates a user interface of an apparatus receiving an incoming voice call from a user's contact according to an example embodiment of the present invention.

Turning now to FIG. 3, in general, an apparatus 50 is provided, such as an apparatus embodied by the mobile terminal 10 of FIG. 1 (e.g., a cellular phone) that has or is otherwise associated with a display, such as a touch screen display 68. As described above, the apparatus 50 may comprise at least one processor (e.g., processor 70 of FIG. 2) and at least one memory (e.g., memory device 76 of FIG. 2) including computer program code. The at least one memory and the computer program code may be configured to, with the processor, cause the apparatus 50 to execute various functions to facilitate communications between a user of the apparatus (e.g., a user of a cellular phone) and a contact of the user.

As mentioned above, knowing what is new and important in a person's life and information about the things that interest them before or during a communication session with the person can help a user to be a smarter, funnier and more thoughtful communicator. Technically, however, it is challenging to capture, summarize, and personalize all the data available about a user's contact that could help tell this story because there are multiple factors and data that can be considered when determining the "right" information to show the user (e.g., information that the user doesn't already know and that would be helpful in the context of the given communication session).

For example, just showing the latest information from a contact's social network feeds (e.g., Facebook or Twitter) may not be good enough because it may only represent the most recent updates in the contact's life and can potentially miss major life events, such as getting married, having a baby, or moving to a new city, that have occurred since the last communication session between the user and the particular contact.

Accordingly, example embodiments of the present invention provide a user with contact-related information items for facilitating communications. The contact-related information items may be presented to a user before, during, or after a communication session between the user and the contact. In this regard, a communication session may be an interaction between the user and the contact during which communications are exchanged. Communications may comprise voice calls (e.g., phone call or Voice Over Internet Protocol (VOIP) call), voice messages, text messages, instant messages, emails, and/or social media messages, among others.

The at least one memory and the computer program code may be configured to, with the processor, cause the apparatus to provide for presentation of one or more contact-related information items in response to receipt of an incoming communication opportunity. A communication opportunity may be any opportunity for the user to enter a communication session with the contact.

With reference to FIG. 3, for example, the apparatus 50 may receive an incoming voice call 100 from a user's contact named Jess. In response, the apparatus 50 may be caused to provide for presentation of options for how the user can handle the incoming communication opportunity (e.g., the call in this case). For example, the user may be able to answer the call, ignore the call, or text a reply by selecting the appropriate button 110, 120, 130 via the touch screen display 68. In addition, at least one contact-related information item 140 may be presented to the user. In the example embodiment of FIG. 3, the contact's current location, local weather, and most recent social update (e.g., from Twitter and Facebook) may be presented to the user via the touch screen display 68.

Figure 4:
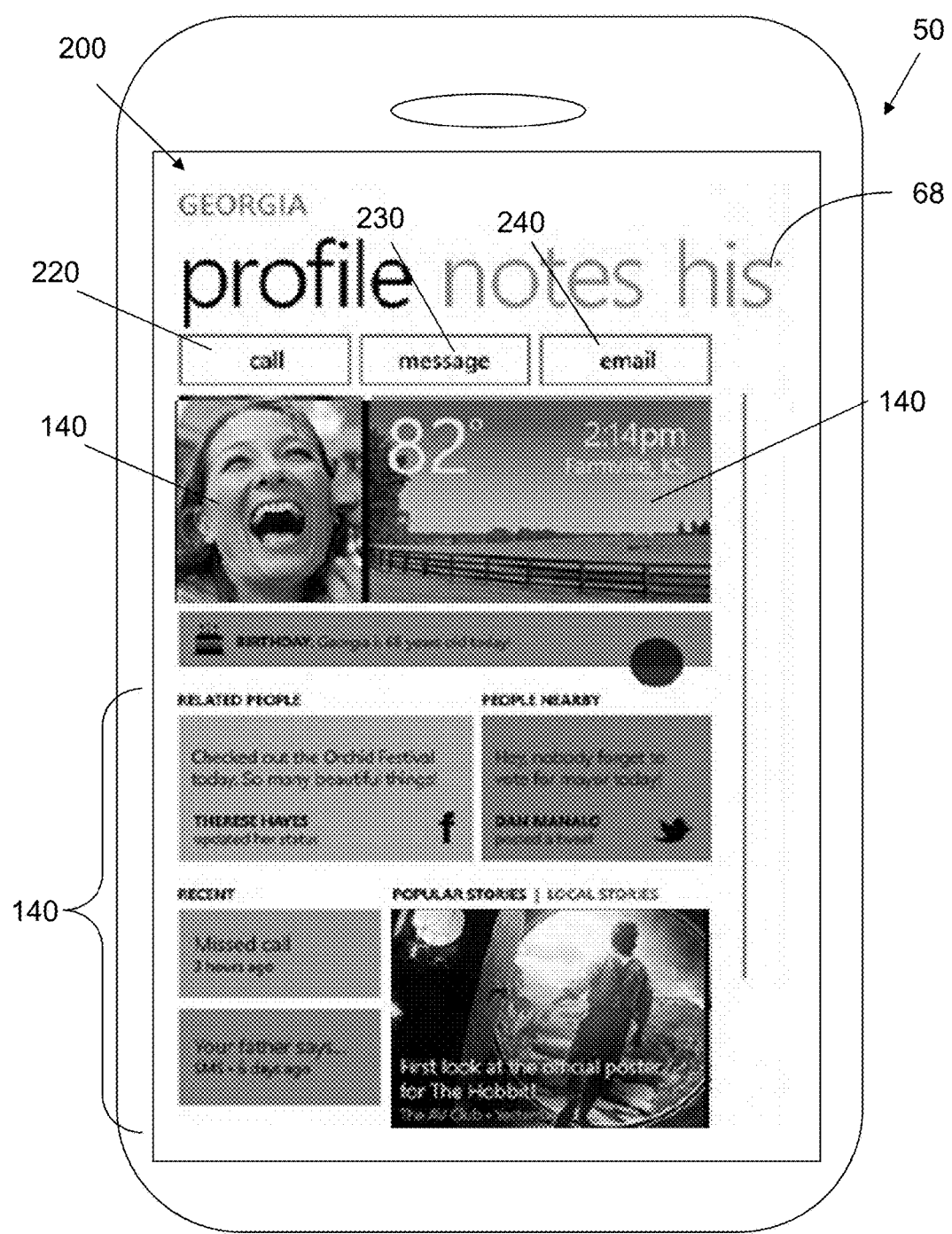
FIG. 4 illustrates a user interface of an apparatus displaying a profile page for the contact according to an example embodiment of the present invention.

In some example embodiments, the apparatus may be caused to provide for presentation of one or more contact-related information items in response to receipt of a user request. For example, the user may see a notification presented on the display 68 informing the user of a contact's birthday (e.g., Georgia, the user's mother). As a result, the user may interact with the apparatus 50 to access a profile page 200 for the contact, shown in FIG. 4. In this regard, the contact's profile 200 may be a listing of various contact-related information items. The contact-related information items may include, for example, the contact's name, the contact's image, the contact's voice number, the contact's address, etc. In some example embodiments, the profile page 200 may provide a user with the option of sending a communication to the contact. In FIG. 4, for example, the profile page 200 includes a picture of the contact, along with various other contact-related information items 140, and options for allowing the user to initiate a communication session (e.g., a voice call 220, text message 230, or email 240) with the contact. Thus, the profile page 200 itself may represent a communication opportunity, as in the depicted example embodiment of FIG. 4.

Figure 5:
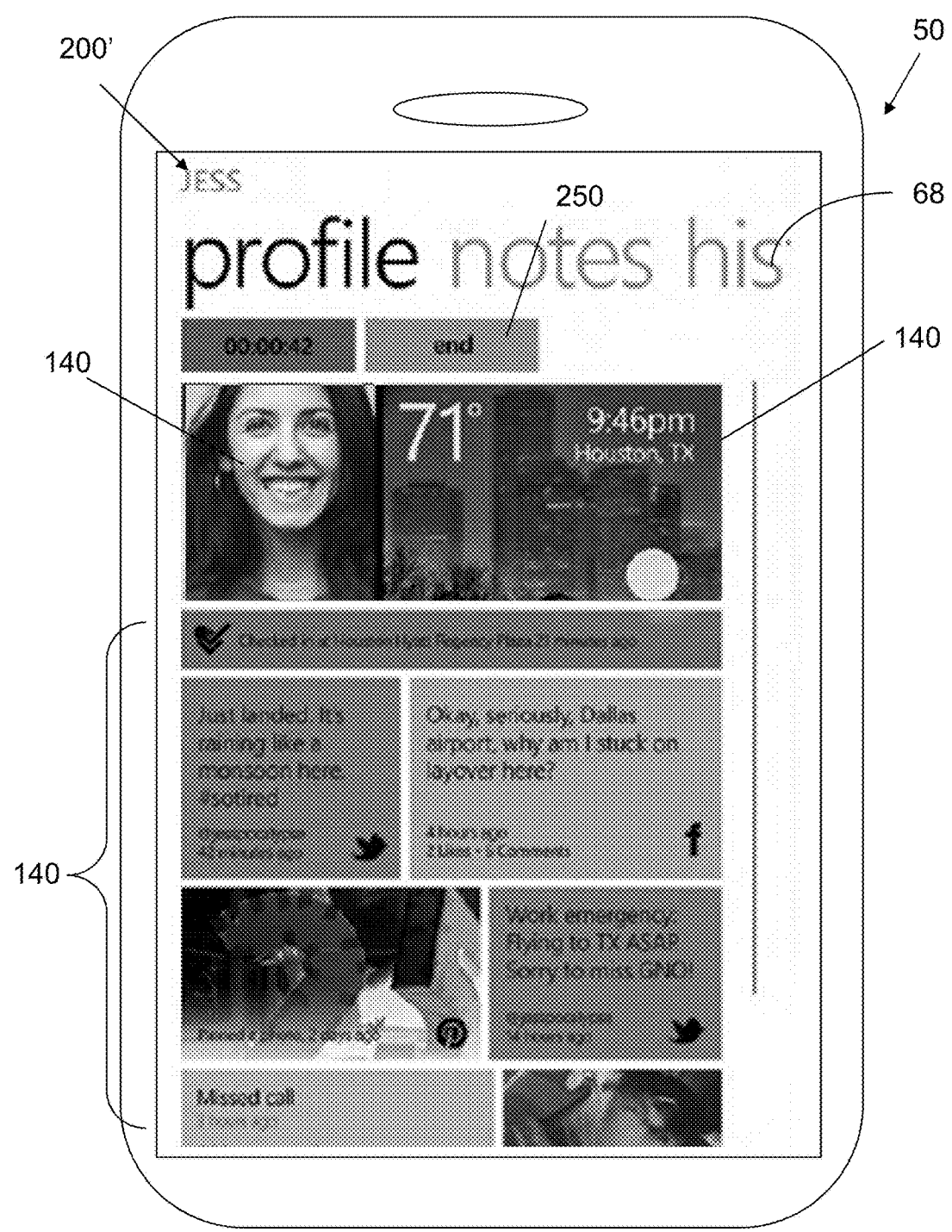
FIG. 5 illustrates a user interface of an apparatus displaying a profile page during a communication session according to an example embodiment of the present invention.

In some cases, the profile page may be caused to be presented upon the initiation of a communication session, such as when an incoming call (incoming call 100 shown in FIG. 3) is answered. An example of the profile page 200' in this example is illustrated in FIG. 5 and may provide the user with different contact-related information items 140 and/or different user interaction options, such as the option to end the call 250. In this example, the contact's location, time, and weather are displayed, along with the contact's latest tweets and status updates, a photo of her nephew that she pinned, a photo she shared via Instagram, and recent communications the user has exchanged with the contact (e.g., missed calls, voice mails, last text message, etc.). Thus, in some embodiments, at least one contact-related information item may be presented during a communication session between the user and the contact (e.g., during a voice call, while an email to the contact is being drafted or an email from the contact is received, during an exchange of text messages, etc.)

As illustrated in FIGS. 3-5, contact-related information items may include any information, posting, message, image, file, or other data related to a particular contact of the user, such as a contact included in the user's list of contacts or address book stored on a memory of the user's device (e.g., the memory device 76 of FIG. 2) or in a memory device otherwise accessible to the apparatus 50 (e.g., a data repository or server accessible to the apparatus over a network, such as the Internet). Such information may be provided as input by the user or as input by the contact. Furthermore, in some example embodiments, the contact-related information items may be third-party published information that is more general and may apply to more than just one particular contact, as described in greater detail below. In still other embodiments, contact-related information items may be derived from a context of a communication (or multiple communications) between the user and the contact, as described below.

For example, contact-related information items may include information such as the contact's age, marital status, job, place of employment (current and/or past), children's names and ages, and major life events (e.g., engagement, marriage, divorce, birth of a new child, new job, birthday, etc.). Information such as the contact's interests (e.g., hobbies, favorite sports teams, favorite music, preferred foods or restaurants), or interests held in common with the user may also be considered contact-related information items. Contact-related information items may also include the user's relationship with the contact. The relationship may comprise a relationship type, (such as whether the contact is, or has been in the past, a parent, son, daughter, extended family member, best friend, friend, boss, employee, co-worker, professional acquaintance, arch-nemesis, etc.), and/or a relationship strength (e.g., very strong, strong, moderate, weak, very weak, etc.).

In some cases, a contact's social network activity, including messages, pictures, website links, etc., that are posted (e.g., by the contact) on a social media website (such as Facebook, Twitter, LinkedIn, Foursquare, Yelp, Sina-Weibo, and so on) may constitute one or more contact-related information items. For example, a contact may post the message "I'm going to see Coldplay perform tonight—so excited!" on her Facebook account. Her message may be considered a contact-related information item as it gives the user information regarding the particular contact (e.g., that she is happy and will be at a Coldplay concert that night). In some cases, the social network activity of others related to the contact (e.g., based on their relationship, geographic proximity, involvement in common communications with the user and the contact, presence as tags in photos, etc.) may be considered contact-related information items.

Other contact-related information items may include more generic information that is published by third-party sources, but that still relate to the contact. For example, location-based information, such as information based on the user's or the contact's current location or recent social media check-ins, may be considered contact-related information items. Such location-based contact-related information items may include weather information, entertainment events (e.g., festivals, parades, displays, shows, etc.), and/or local news events.

In some example embodiments, the context of the communication between the user and the contact itself may provide contact-related information items. As noted above, the at least one memory and the computer program code may be configured to, with the processor, cause the apparatus 50 to identify a relationship of a contact with the user. In this regard, the type of communication that is used may be informative. For example, in some cases, the relationship between the contact and the user may be identified based at least in part on how the two communicate (e.g., whether the communication occurs over a voice call, such as via a cell phone call or using VOIP, using instant messaging, using text messages, via e-mail, etc.). In addition, the time of day and/or day of the week the communications occur may be indicative of the relationship (e.g., whether the communication occurs during working hours, at the end of the work day, on weekends, in the middle of the night, or at the same time every day). A user who places a voice call to a certain contact every workday between 5 PM and 6 PM may, for example, be presumed to be communicating with a close family member (e.g., a spouse or child) to let them know of his or her departure from work and expected arrival time at home. Furthermore, a direction of the communication (e.g., incoming, outgoing, or bi-direction with respect to the user) may provide an indication of the relationship between a user and a contact. For example, a user's contact may be an email newsletter that sends the user daily news emails (to which the user never responds), as compared to a contact who is a friend and with whom the user has bi-directional (e.g., incoming and outgoing) communications.

In addition, the communication frequency between the user and the contact may be contextual information that provides contact-related information items. The communication frequency may be determined (e.g., by the apparatus 50) by determining a length of time between a most recent communication session with the contact and a current communication opportunity. Alternatively or additionally, the at least one memory and the computer program code may be configured to cause the apparatus 50 to determine the communication frequency by determining a total number of communication sessions with the contact over a predetermined period of time, such as over a day, one week, two weeks, a month, three months, etc. In some cases, the communication frequency may be determined by determining a total communication time with the contact over a predetermined period of time and/or an average time between communication sessions.

The communication frequency may, for example, be another indication of the relationship of the contact with the user. In the example described above, in which the user places a voice call to a particular contact every workday, the communication frequency may be determined by considering that the most recent communication session (e.g., the voice call) at the time of a current communication opportunity (e.g., at the time the user goes to place another call to that same contact) took place only one day earlier. In addition or in the alternative, the communication frequency may consider that over the last seven-day period the user called that contact five times. Moreover, the fact that each communication session only lasted between one and three minutes (or a total of eight and a half minutes over the last seven-day period) may be a further indication that the calls were placed to a close family member that only needed a quick status report, rather than someone with whom the user communicates less frequently and would generally require a longer conversation.

Figure 6:
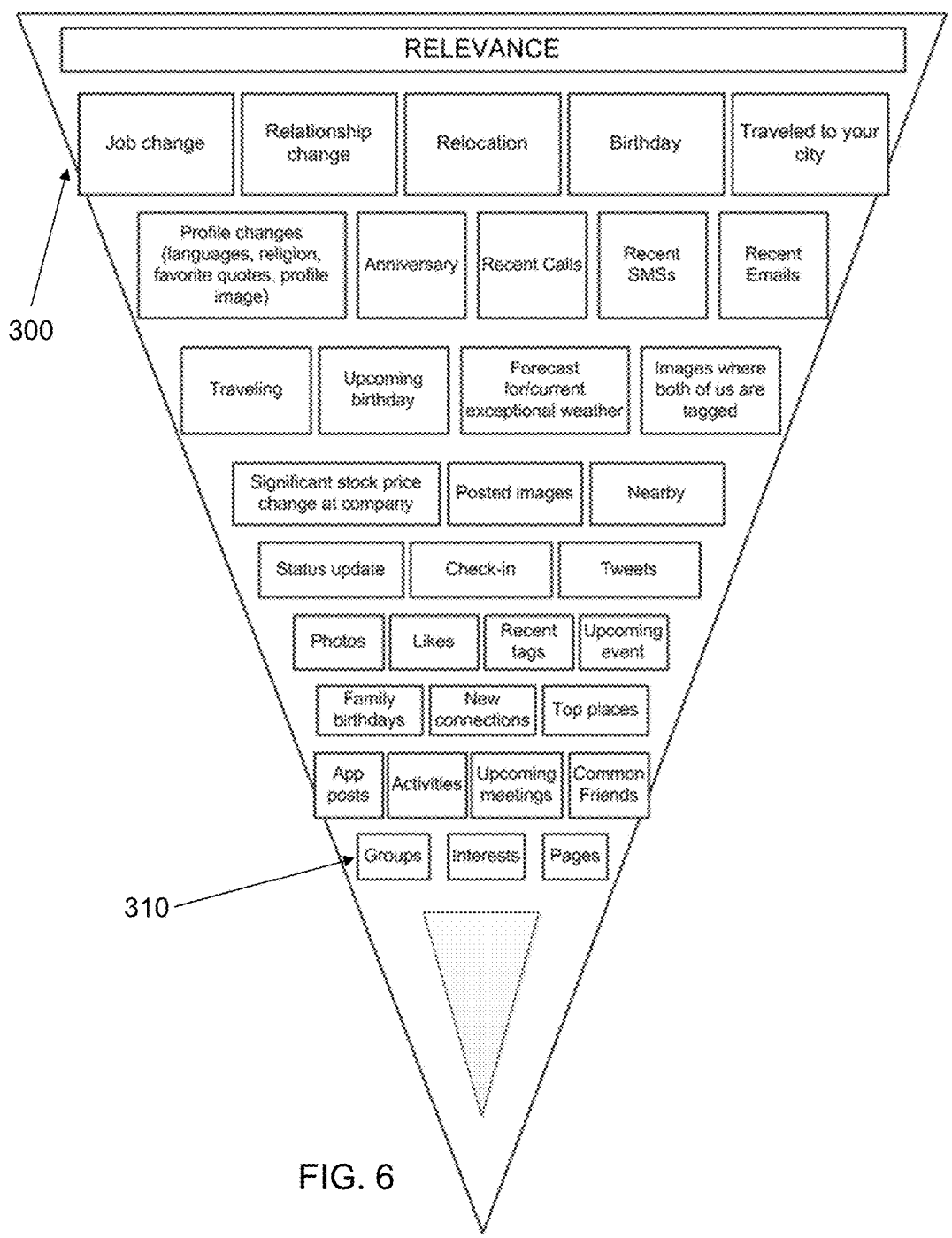
FIG. 6 illustrates a relevance hierarchy according to an example embodiment of the present invention.

Turning now to FIG. 6, in some example embodiments, the at least one memory and the computer program code may be configured to, with the processor, cause the apparatus to at least determine whether a contact-related information item associated with a first relevance level is available. In an instance in which the contact-related information item associated with the first relevance level is available, the apparatus may be further caused to provide for presentation of the contact-related information item associated with the first relevance level. In an instance in which the contact-related information item associated with the first relevance level is unavailable, the apparatus may be further caused to access a contact-related information item associated with a second relevance level and provide for presentation of the contact-related information item associated with the second relevance level, the second relevance level being lower than the first relevance level.

For example, as shown in FIG. 6, different types or categories of contact-related information items (e.g., job change, relationship change, relocation, etc.) may be arranged in tiers from a highest level of relevance 300 to a lowest level of relevance 310. For example, a weighted algorithm may be applied (e.g., by the apparatus 50 or a remote processor, such as a third-party server) to determine contextually relevant information to present to the user regarding the particular contact.

Figure 7:
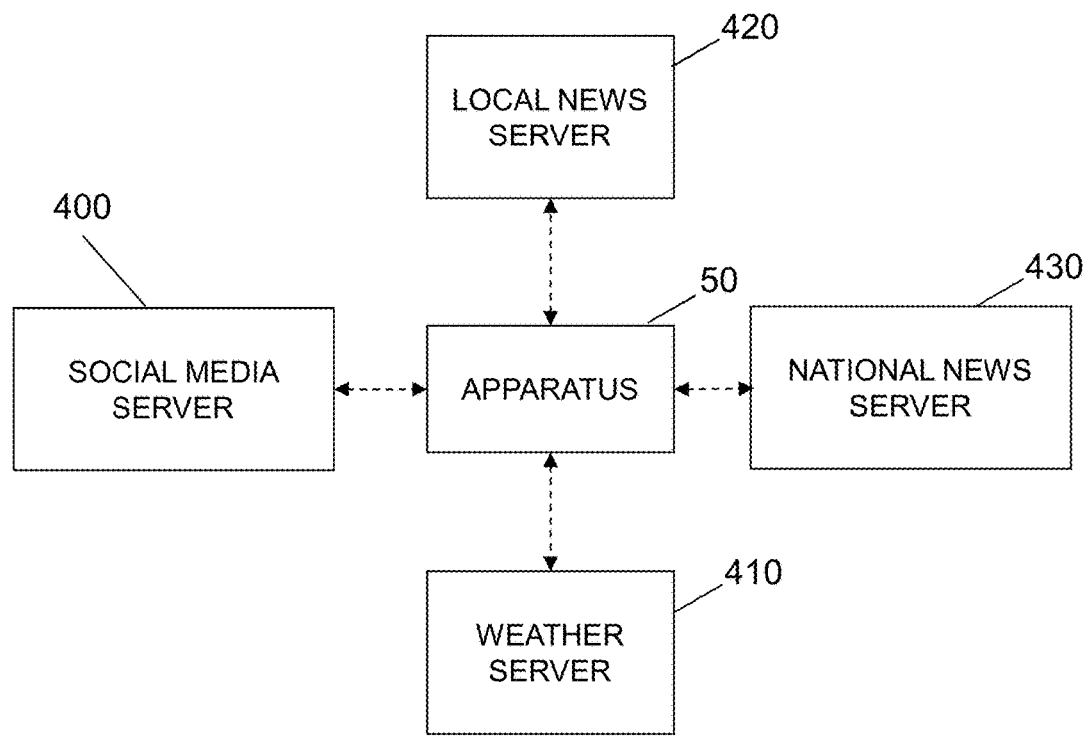
FIG. 7 illustrates a schematic block diagram of an apparatus communicating with servers to access contact-related information items according to an example embodiment of the present invention.

According to some example embodiments, the apparatus 50 may be configured to seek out contact-related information items that have been determined to have a highest relevance level 300, first. For example, turning to FIG. 7, to populate a profile page, such as the page 200 shown in FIG. 4, the apparatus 50 may initially communicate with one or more social media servers 400 to access contact-related information items, such as items the contact may have posted on Twitter or Facebook. In some cases, however, the contact may not have any social media accounts or may not be actively contributing content or updates to such accounts, and thus contact-related information items defined as having a highest level of relevance 300 (in this example) may not be available. In this case, rather than leaving part of the profile page blank for lack of contact-related information items in the highest level of relevance 300, the apparatus 50 may seek other contact-related information items having relatively lower levels of relevance from other sources, such as from one or more weather servers 410, local news servers 420, and/or national news servers 430. Thus, to fill up available space on the profile page 200 of FIG. 4, the apparatus 50 may be caused to present non-personal, but still relevant data with respect to the particular contact, such as using location-based information feeds or other locally relevant or contextually relevant information, including news stories relevant to the contact's home city, a weather forecast for the contact's home city and/or current location, social media or other status updates from mutual contacts, etc. For example, it may be interesting for a user who is about to initiate a communication session with her mother to know what her brother has been doing so that she can include this information in her communication with her mother.

In this regard, at least one of the first relevance level or the second relevance level may be predefined (e.g., through application of a weighted algorithm and/or resulting in a relevance hierarchy as depicted in FIG. 6). In some cases, at least one of the first relevance level or the second relevance level may be based at least in part on input provided by the user. For example, the user may consider certain contact-related information items (e.g., the names of the contact's family members and their ages) to be more important than other types of contact-related information items. The user's designations may apply to all of the user's contact, certain types of contacts (e.g., contacts with a particular relationship to the user, such as to apply to co-workers, but not family members), or only to particular contacts as designated by the user.

For example, specific metadata (e.g., metadata associated with contact-related information items such as children's names and ages) may be assigned to all, some, or a single contact. In the case of a child's name, this information may be relevant to only a single contact. Additionally, a user may be able to assign a higher relevance to general news about a specific user-defined topic for a group of contacts or an individual contact. For example, if a user's father loves golf, but the user himself does not care about golf, the user may wish to bring up the latest golf news when initiating communication sessions with his father, but not when initiating communication sessions with other contacts.

In other cases, at least one of the first relevance level or the second relevance level may be based at least in part on input provided by the contact. For example, the contact may designate certain types of contact-related information items (items related to himself or herself) as items the contact would like another person (e.g., the user) to see and consider before other, less important contact-related information items. Such self-designations may, for example, occur via postings on the contact's social media account or via settings within a communications application.

In some example embodiments, the contact-related information item associated with the first relevance level may comprise contact-specific data. This may include data that only applies to that particular contact, such as a birthday, names of family members, job title, place of residence, astrological sign, favorite sports teams, social network status updates, etc. Such contact-related information items may be considered more relevant than other types of contact-related information items (e.g., having greater relevance to a user) because they specifically describe the particular contact, as compared to more generic information, such as the weather at the contact's location or local events.

Figure 8:
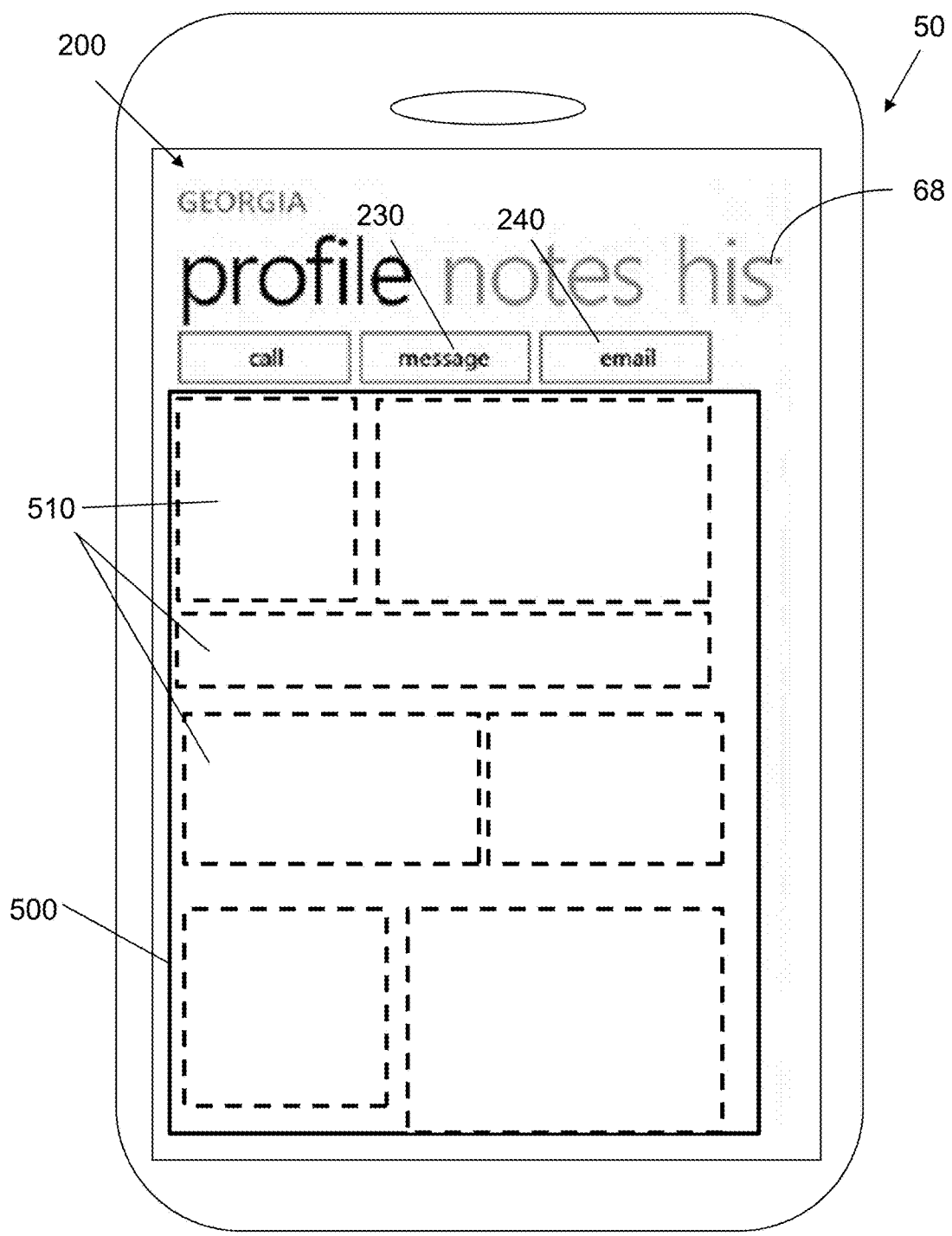
FIG. 8 illustrates a user interface of an apparatus having a predefined display area including sub-areas for presenting contact-related information items according to an example embodiment of the present invention.

The at least one memory and the computer program code may be further configured to, with the processor, cause the apparatus to provide for presentation of the contact-related information item by displaying the contact-related information item within a predefined display area associated with a communication opportunity (e.g., an incoming phone call, a profile page, etc., as described above). Turning to FIG. 8, for example, a display area 500 may be predefined and associated with the communication opportunity (the profile page 200 in the depicted example). The display area 500 may comprise one or more sub-areas 510 in which contact-related information items may be presented. In some example embodiments, the display area 500 may be larger than the screen size, such that a user would have to scroll the page to view all content presented in the display area 500. Moreover, a minimum size of the display area 500 may be defined, for example, such that a minimum amount of content is needed to fill up the display area.

In an instance in which the predefined display area 500 is incomplete (e.g., is not used to present any contact-related information items), the apparatus 50 may be caused to determine at least one additional contact-related information item, such that the additional contact-related information item(s) may be used to complete the predefined display area. In an instance in which an additional contact-related information item associated with the first relevance level is unavailable (e.g., because there are fewer contact-related information items existing that have a first relevance level than there are sub-areas 510 to display them), the apparatus may be caused to access a contact-related information item associated with the second relevance level and to provide for presentation of the contact-related information item associated with the second relevance level within the predefined area. In other words, in some example embodiments, the apparatus 50 is configured to work its way down the relevance hierarchy (e.g., the hierarchy of FIG. 7) until enough contact-related information items are accessed and/or determined such that the predefined display area 500 is filled in an aesthetically pleasing way. Thus, in the example depicted in FIG. 4, because the user's contact Georgia is not active on social networks, her profile 200 is made up of relevant information from public and local data, including her location, local time and weather, special occasions in her life (e.g., her birthday, anniversary, etc.), a feed of local news and events, social content from other contacts who live near Georgia or are otherwise associated with Georgia (e.g., her family members), and a customizable news feed from top content providers (e.g., news aggregated from various news sources or content providers, such as CNN, a local newspaper, USA Today, The Weather Channel, ESPN, etc., that is customized to this particular contact).

Furthermore, as noted above, the at least one memory and the computer program code may be further configured to, with the processor, cause the apparatus to determine whether a contact-related information item associated with the first relevance level is available in response to at least one of a receipt of an incoming communication opportunity associated with the contact (e.g., an incoming call or text message from the contact) or receipt of a user request (e.g., the user's input to open a profile page for the contact).

As described above, the relationship between a user and a contact may be an important factor for determining relevance of a contact-related information item. In other words, in some example embodiments, relevance of a contact-related information item may be determined in the context of the relationship that exists between the user and the contact (e.g., how appropriate the information is in light of the relationship). Thus, for example, although a user may have access to very personal information about a contact who is the user's boss (such as personal interests or weekend plans), because the relationship is one of an employer-employee, the user may only be interested in seeing contact-related information items regarding this particular contact's availability, current location, latest communication with the user, etc. Accordingly, in some example embodiments, the at least one memory and the computer program code may be configured to, with the processor, cause the apparatus to at least identify a relationship of a contact with a user, determine whether a contact-related information item is relevant to a user based on the relationship identified, select at least one contact-related information item determined to be relevant (e.g., in light of the identified relationship), and provide for presentation of the at least one of the contact-related information items selected.

The relationship between the user and the contact may be identified in various ways. The relationship of the contact with the user may, for example, be user-defined (e.g., where the user designates the contact as having a particular relationship, such as "mother," via user input directly into the contact's profile page).

Additionally or alternatively, the relationship of the contact with the user may be determined based on a context of at least one previous communication between the user and the contact, as described above. For example, the content of the communication (e.g., keywords such as "love," "honey," etc., frequently used words, other of the user's contacts referenced in the communication, etc.), as well as the communication history and frequency, type of communication (voice call, text message, instant messaging, email, Facebook "like," Facebook post, Facebook comment, etc.), the reason the communication is made, and other contextual information may be considered in identifying the relationship between the user and the contact.

Figure 9A:
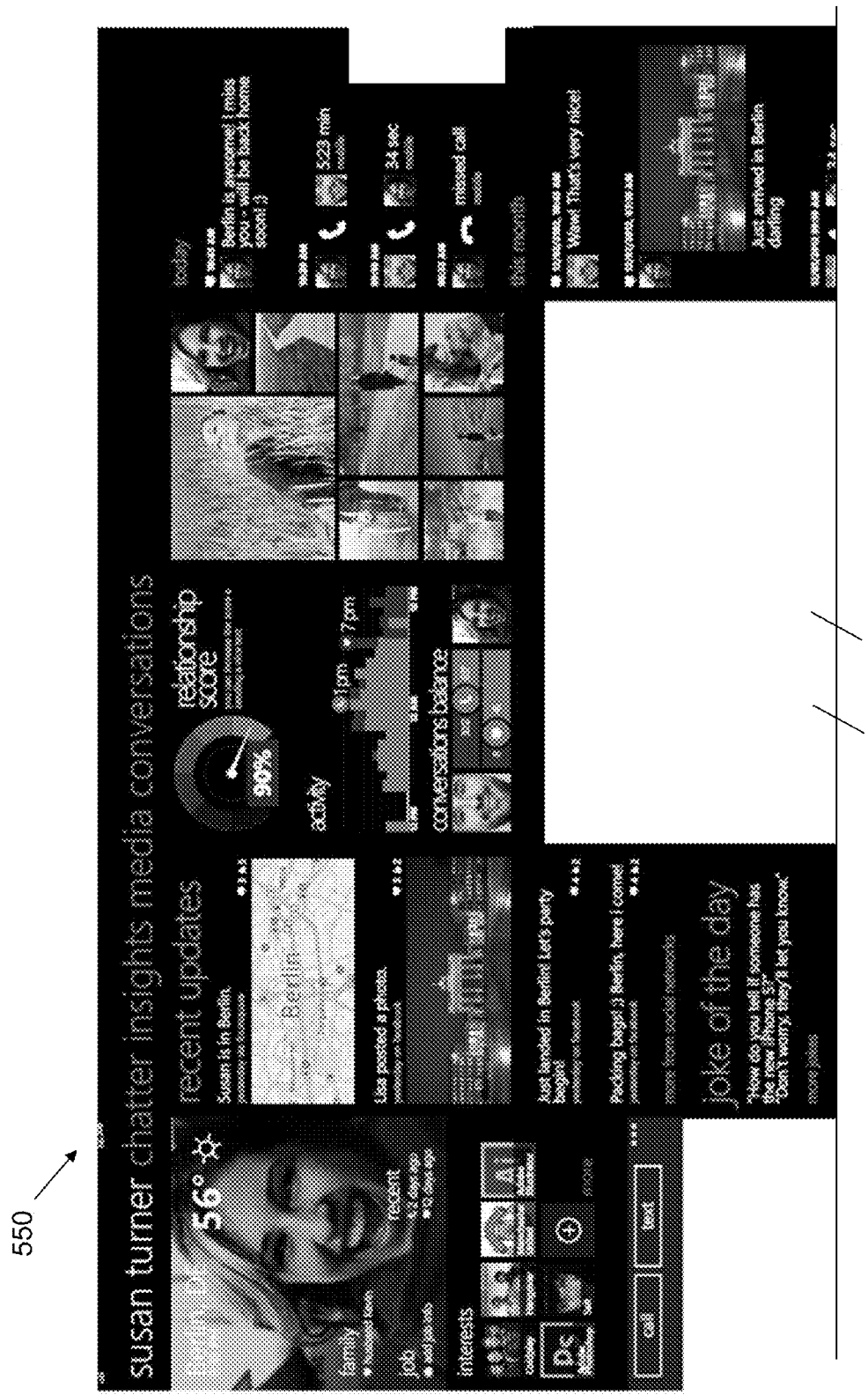
FIGS. 9A-9B illustrates a user interface of an apparatus configured to display contact-related information items based on an identified relationship according to an example embodiment of the present invention.
Figure 9B:
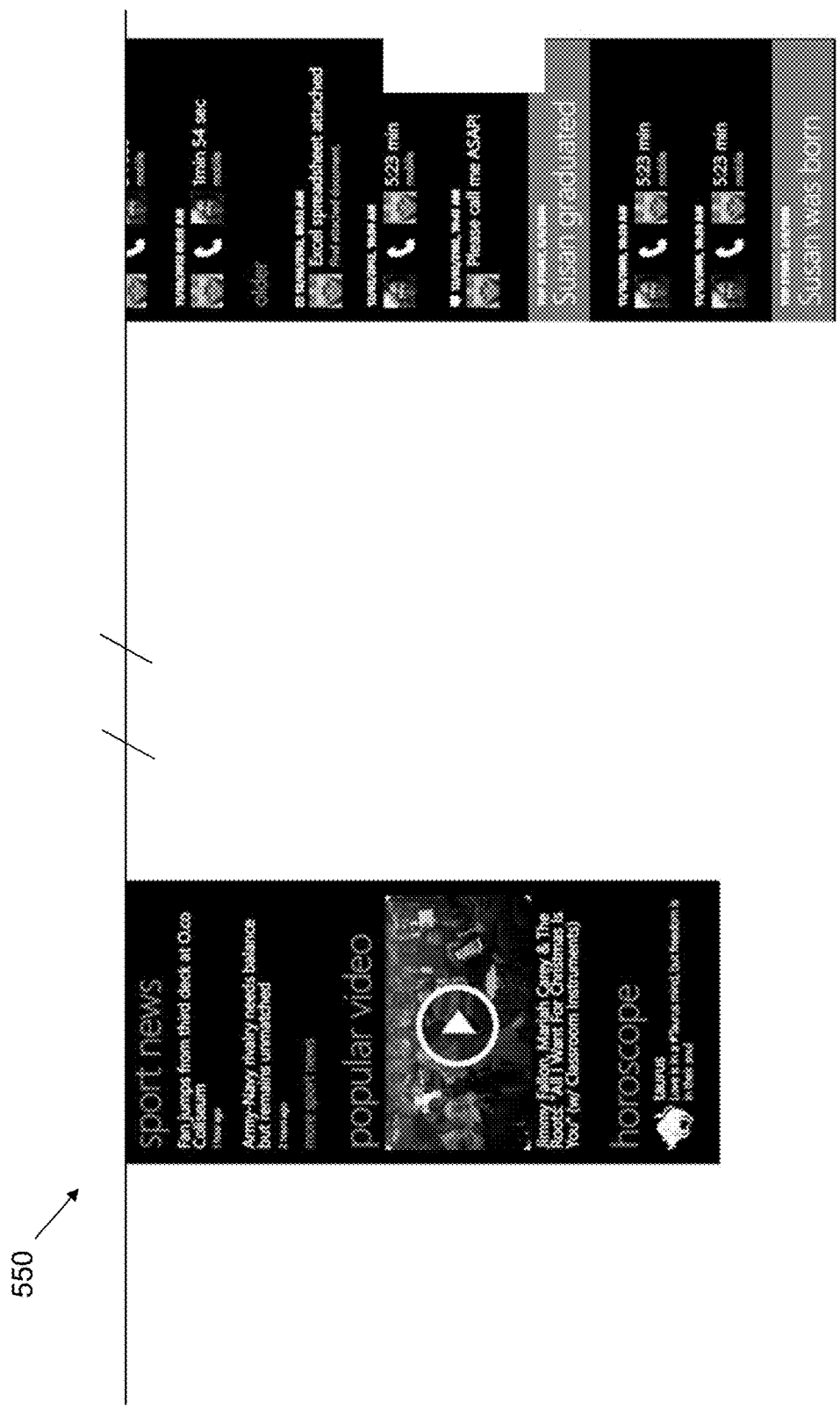

The apparatus may be caused to determine an optimized user interface layout for displaying contextually rich, relevant information about a contact based on the relationship that is identified. An example of a user interface 550 is shown in FIGS. 9A and 9B and may include various media types, content availability, relationship strength between callers, time of day, frequency of calls, and so on. Data feeds from multiple disparate data sources (e.g., local weather, local news, Facebook, Twitter, etc., as illustrated in FIG. 8) may be integrated and processed to derive the relationship between the user and the contact, as well as other indicators of the relevance of contact-related information items. In some example embodiments, the apparatus may be configured to "learn" over a period of time, such that the more communications are exchanged between a user and a particular contact, the more accurate the assessment of the relationship (e.g., the relationship type and/or the relationship strength). Thus, communication history data may be used to augment the ranking and processing of raw data coming in from public and private feeds, such as local news, national news, and social networks, as described above. Moreover, a mechanism for user feedback may be provided to tune performance and information relevance.

In some example embodiments, the apparatus 50 is caused to characterize the relationship between the user and the contact (e.g., the relationship type and/or the relationship strength) by constructing a relationship profile, which may be used to inform the determined relevance of certain contact-related information items. Thus, the contact-related information items determined to be relevant may comprise a subset of contact-related information items accessible to the user. For example, a user who is about to initiate a communication session with a professional acquaintance may find it relevant to know that contact's current job title. Upon initiating a communication session with a contact who is his mother, however, the contact's current job title would not be relevant.

Furthermore, the interests of the user and the contact may be collected from social networks and manually entered data (e.g., user input). This data may be normalized, classified, and processed in order to both personalize the presentation of contact-related information items, such as news and current events, and to present common interests (e.g., interests shared by both the user and the contact). For example, if a user's contact is a fan of a particular football team, the apparatus may be configured to present news relating to that team's most recent game.

As noted above, the user's location, the contact's location, their respective residences, and their respective hometowns may be analyzed to generate ranked news items. For example, it may be important for a user to know that the contact is traveling or visiting the user's town. In some cases, the velocity of the contact's travel (e.g., how quickly the contact's present location is changing) may be calculated and used to deduce the contact's mode of transportation (e.g., by foot, by car, or by plane).

In still other embodiments, as described above, basic contact-related information items such as a contact's name, company, birthday, spouse, etc. may be collected, de-duplicated, and merged. For example, contact-related information items may be collected from multiple social networks (e.g., LinkedIn, Facebook, Twitter, etc.), and a user may have some of the same people listed as contacts or "friends" in more than one network. Accordingly, duplicate contacts may need to be identified to ensure that, for example, a single person is not represented as multiple contact entries in the processing of contact-related information items. As noted above, contact-related information items may come from various sources, such as social media networks, email services, and/or an address book or contact list associated with the apparatus. Moreover, local and national news may be collected from social media networks and personalized based on interests and location data that is cross-referenced with, for example, relevant Twitter accounts.

Figure 10:
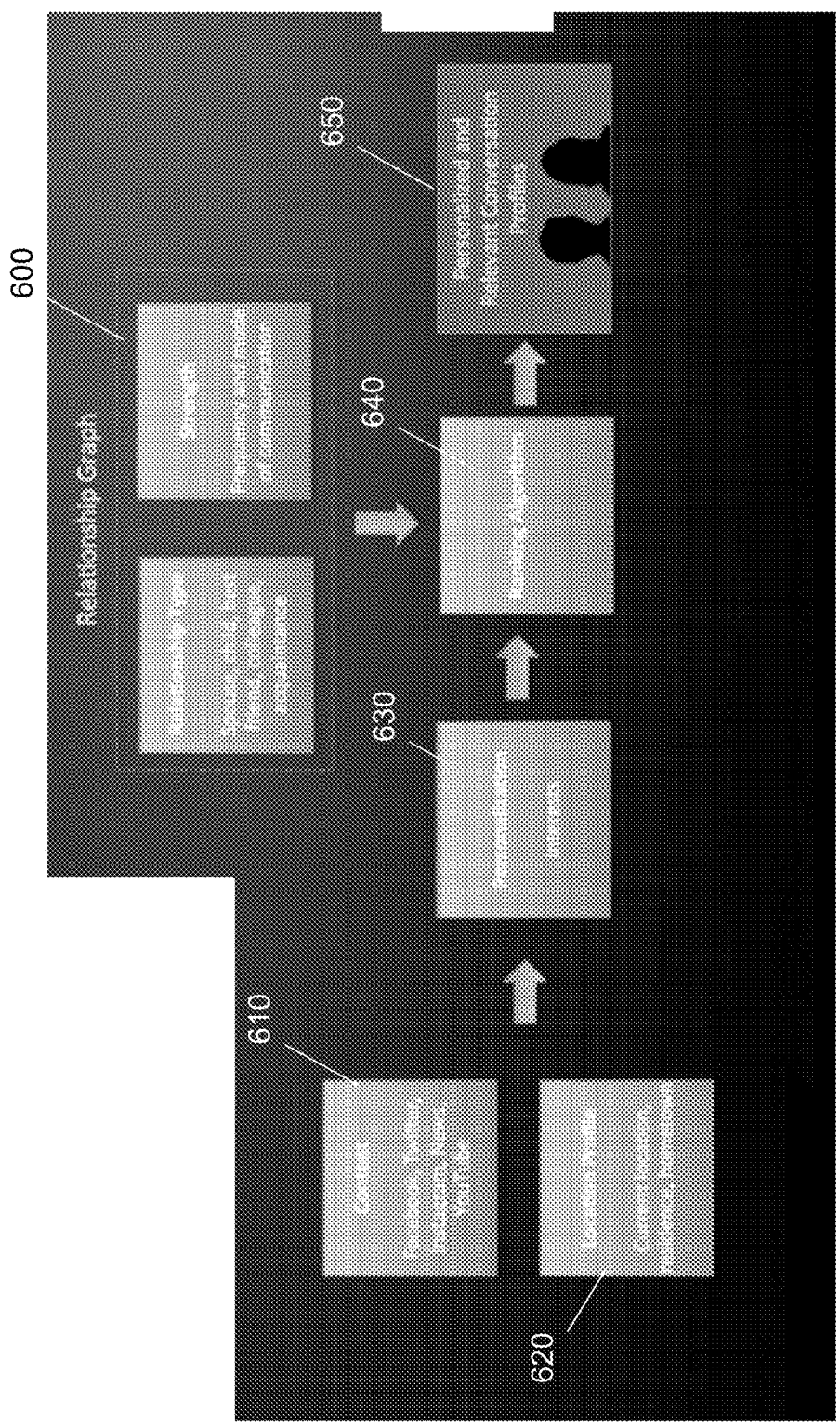
FIG. 10 illustrates a flowchart describing an analysis for identifying relevant contact-related information items for constructing a contact's profile according to an example embodiment of the present invention.

FIG. 10 illustrates the analysis that may be made for identifying relevant contact-related information items for constructing a contact's profile (such as the profile 200 in FIG. 4) according to some example embodiments. In FIG. 10, a relationship graph 600 that includes a relationship type and a relationship strength may be constructed, as described above. Content 610 from social media networks and the contact's location profile 620 may be analyzed, and the data may be personalized based on the contact's and/or the user's interests at block 630. A ranking algorithm 640 may be applied to the personalized data 630 using information from the relationship graph 600 to come up with a personalized and relevant conversation profile 650 for the contact.

Figure 11:
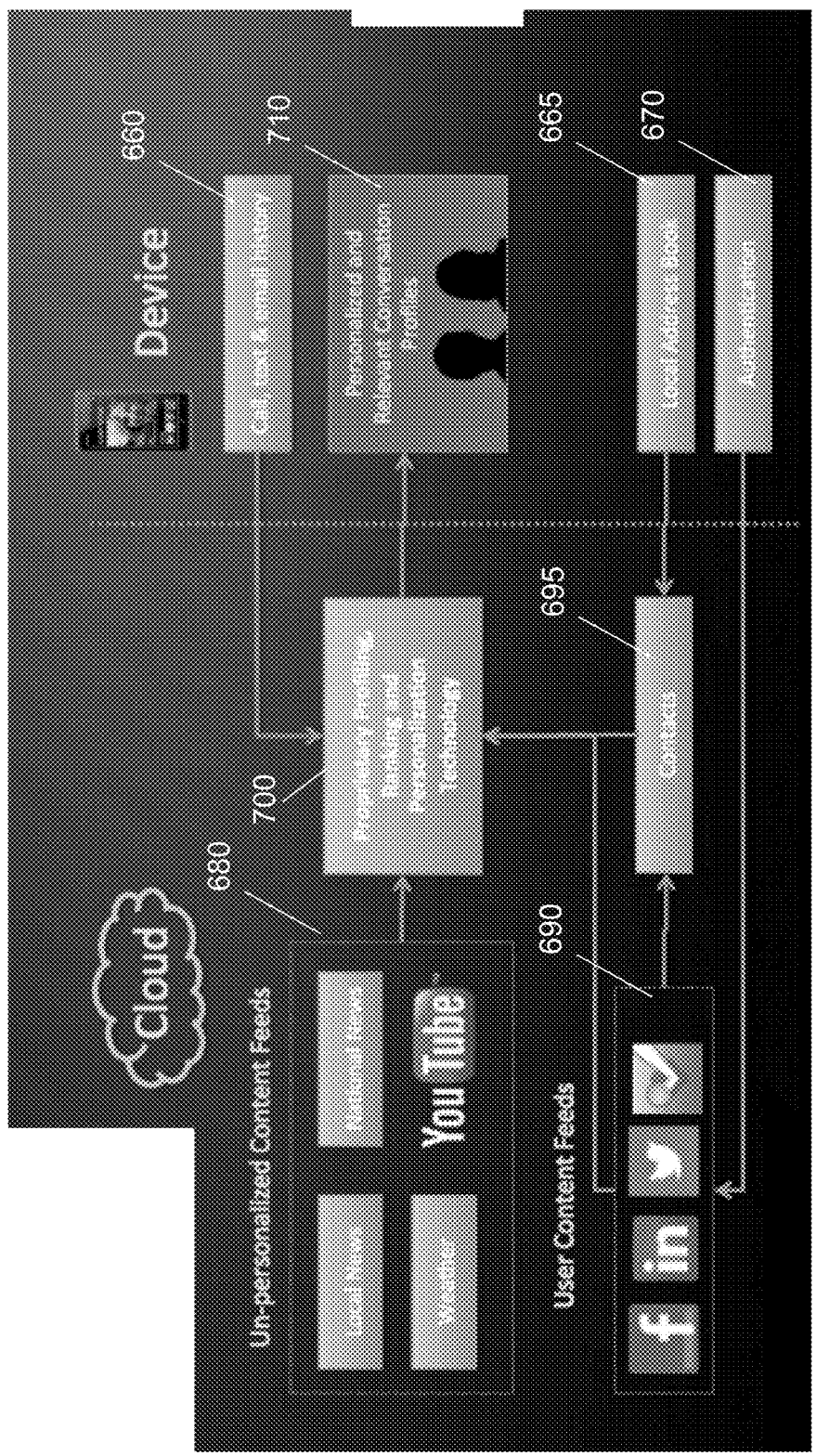
FIG. 11 illustrates a schematic block diagram of sources of contact-related information items according to an example embodiment of the present invention.

In FIG. 11, the various sources of contact-related information items are illustrated. As shown and described above, some contact-related information items may come from the device associated with or embodying the apparatus (e.g., the user's cellular phone), such as call, text, and email history 660 and local address book information 665. Authentication information 670, such as user names and passwords for accessing the user's social media accounts, may also be stored on the device. Other contact-related information items may come from a cloud or other network environment. For example, un-personalized content feeds 680 from local news, national news, and weather services, as well as You Tube, may be accessed from the cloud, along with user content feeds 690 such as feeds from Facebook, LinkedIn, Twitter, and Foursquare. Contact-related information items from the un-personalized content feeds 680, user content feeds 690, and from the device 660, 665 may be used (along with the contact information 695) for applying an algorithm 700 to profile, rank, and personalize the contact-related information items so as to come up with a personalized and relevant profile 710 that is presented via the device, as shown.

Thus, as described above, contact-related information items may be generated by pulling data from multiple third party data sources and feeds and enhancing and filtering the data using a user's communication history with the contact. There may be no need for any specialized hardware or a browser.

In still other example embodiments, the at least one memory and the computer program code described above may be configured to, with the processor, cause the apparatus to at least provide for presentation of a communication opportunity with a contact of a user (as described above) and determine a communication frequency between the user and the contact. At least one contact-related information item may be determined based on the contact and the communication frequency determined, and the apparatus may be caused to provide for presentation of the at least one contact-related information item, such that the at least one contact-related information item is accessible to the user in a communication session with the contact (e.g., before, during, and/or after a communication session). As described above, the communication opportunity may comprise at least one of an incoming communication (e.g., an incoming voice call or text message), an outgoing communication (e.g., a dialed voice call or outgoing text message), or a contact profile, such as the profile 200 shown in FIG. 4.

In addition to the length of time between a most recent communication session with the contact and a current communication opportunity, the total number of communication sessions between the user and the contact over a predetermined period of time, and the total communication time between the user and the contact over a predetermined period of time, as described above, the communication frequency may include passive observation by the user of the contact's social network feeds. For example, a user who has very recently (e.g., within the last two hours) visited a contact's Facebook page would likely not find postings from the contact's Facebook page to be relevant contact-related information items (e.g., because that content has already been viewed by the user). Moreover, there may be cases in which the user communicates frequently with a contact, but does not consider that contact to be interesting and would not particularly like to see detailed or personal contact-related information items, such when the contact is the user's boss. At the same time, a user may not communicate directly with a contact (e.g., a secret crush), but may instead visit their Facebook page very often. In this case, the user may find every post made by the contact to be relevant, despite the seemingly infrequent communication. In this regard, the communication frequency may comprise a passive communication frequency, such as the frequency (as described above) associated with a reading or monitoring of a contact's communication activity (e.g., monitoring the contact's social media activity). Moreover, a user may provide input indicating a particular contact as a contact of interest.

The at least one memory and the computer program code may be further configured to, with the processor, cause the apparatus to determine the communication frequency by considering communication comprising at least two categories, including voice calls (e.g., phone calls and VOIP), text messages, instant messages, emails, and social media messages. For example, a communications application may be provided at a level within the software of the apparatus 50 such that the application has access to a number of communications that use various channels and/or different communication protocols. In some cases, the apparatus may be caused to access contact-related information items from a third-party server, such as a local or national news feed.

In still other example embodiments, the at least one memory and the computer program code may be further configured to, with the processor, cause the apparatus to determine the at least one contact-related information item by determining whether a particular contact-related information item is a general content item or a detail content item. A general content item may include information such as the weather at the contact's current location or nearby events, whereas a detail content items may include the contact's children's names and the contact's birthday, for example. Moreover, the apparatus may be caused to provide for presentation of a general content item in an instance in which the communication frequency that is determined to be below a predefined threshold frequency and to provide for presentation of a detail content item in an instance in which the communication frequency determined is above a predefined threshold. For example, if it has been six months since the user last communicated with the contact, a general content item, such as the contact's current location may be presented, whereas if it has only been six days since the last communication, the contact's social media network postings from the past day or week may be provided as relevant.

Said differently, always showing the latest information from a contact's social network feeds (e.g., Facebook and Twitter) may not be appropriate or relevant to a user who hasn't communicated with the contact in months. This is because the contact may have had a major life experience (e.g., marriage, birth, relocation) within the last six months which, although big, may already be "old news" and not included in the contact's latest social media postings. Moreover, a contact's level of activity on social media websites may be taken into account in the presentation of the contact-related information items from the social media networks to provide for the most-user friendly user interface. For example, as described above, a contact who has limited or no social media network activity, rather than have a sparsely populated or blank user profile, may pull other contact-related information items to fill in the empty space such as from local news and weather feeds. At the other end of the spectrum, a contact who has a very high level of activity on social networking sites my have an overabundance of contact-related information items from those sources, some of which may even be redundant. Example embodiments of the invention thus determine how to best display the information and highlight the most relevant contact-related information items with respect to the particular user. In addition, in cases where certain information about the contact is missing, the apparatus may be caused to prompt the user (via the user interface) to manually enter more information about the contact and/or themselves (e.g., using game mechanics to encourage users to complete all the information).

In some example embodiments, contact-related information items may be determined to be relevant for presentation to the user based on a series of considerations, such as the following:

Is the contact active in Social Networks? If so, which ones?

Does the contact have a Profile Picture available from the phone or other social network?

What is the Local Time of that contact?

Does the contact have a mobile phone number?

Does the contact text?

Do we have access to news about the contact?

Do we have any Family information?

What is this contact's job?

What are the contact's interests?

Do we have access to photos posted by this contact?

Where is this contact located?

Do we have access to other news, jokes, conversation starter feeds for this contact?

Do we have access to information about the local news for this contact?

Figure 12:
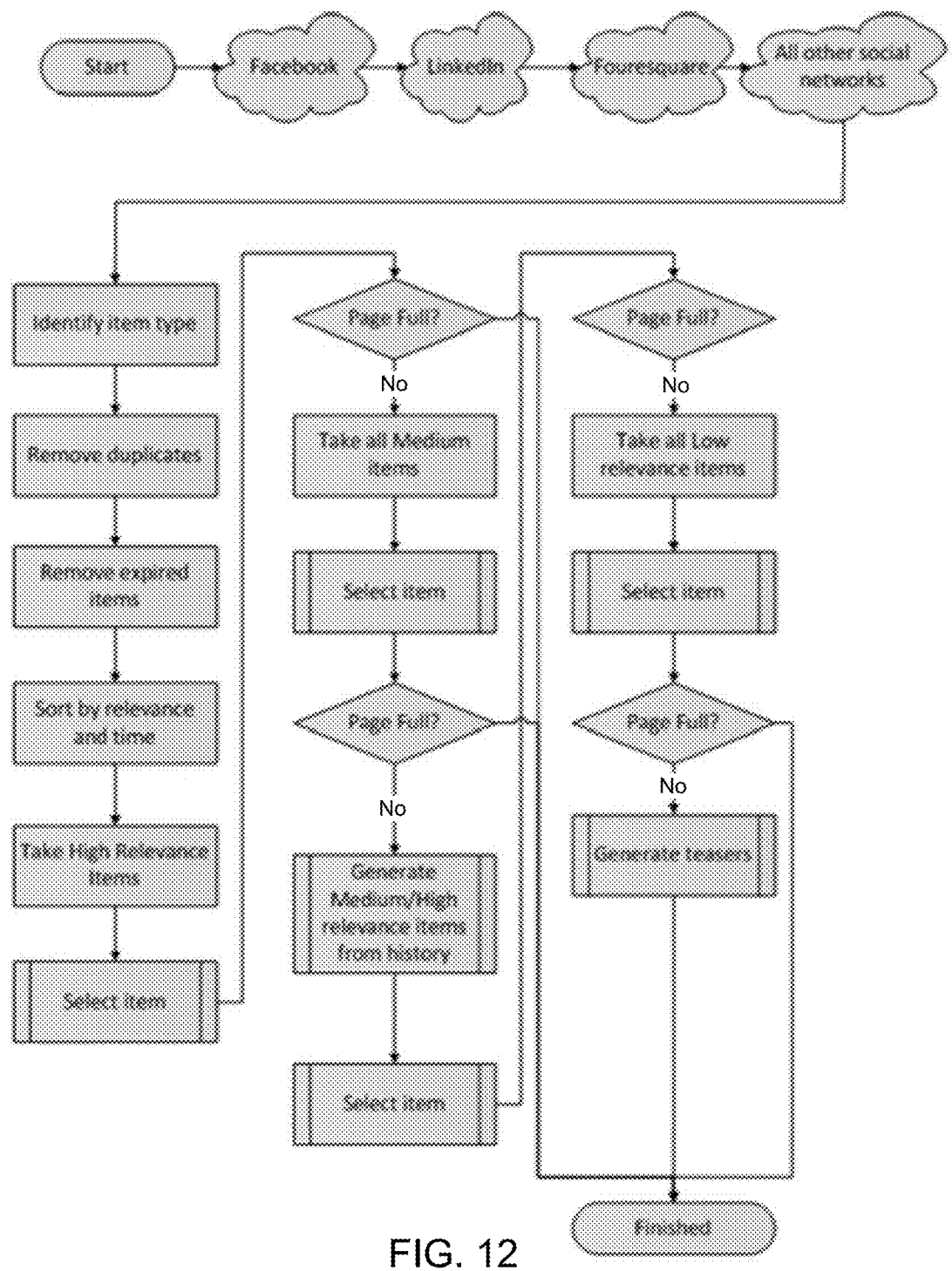
FIG. 12 illustrates a flowchart describing selection of relevant contact-related information items for presentation to the user according to an example embodiment of the present invention.
Figure 13:
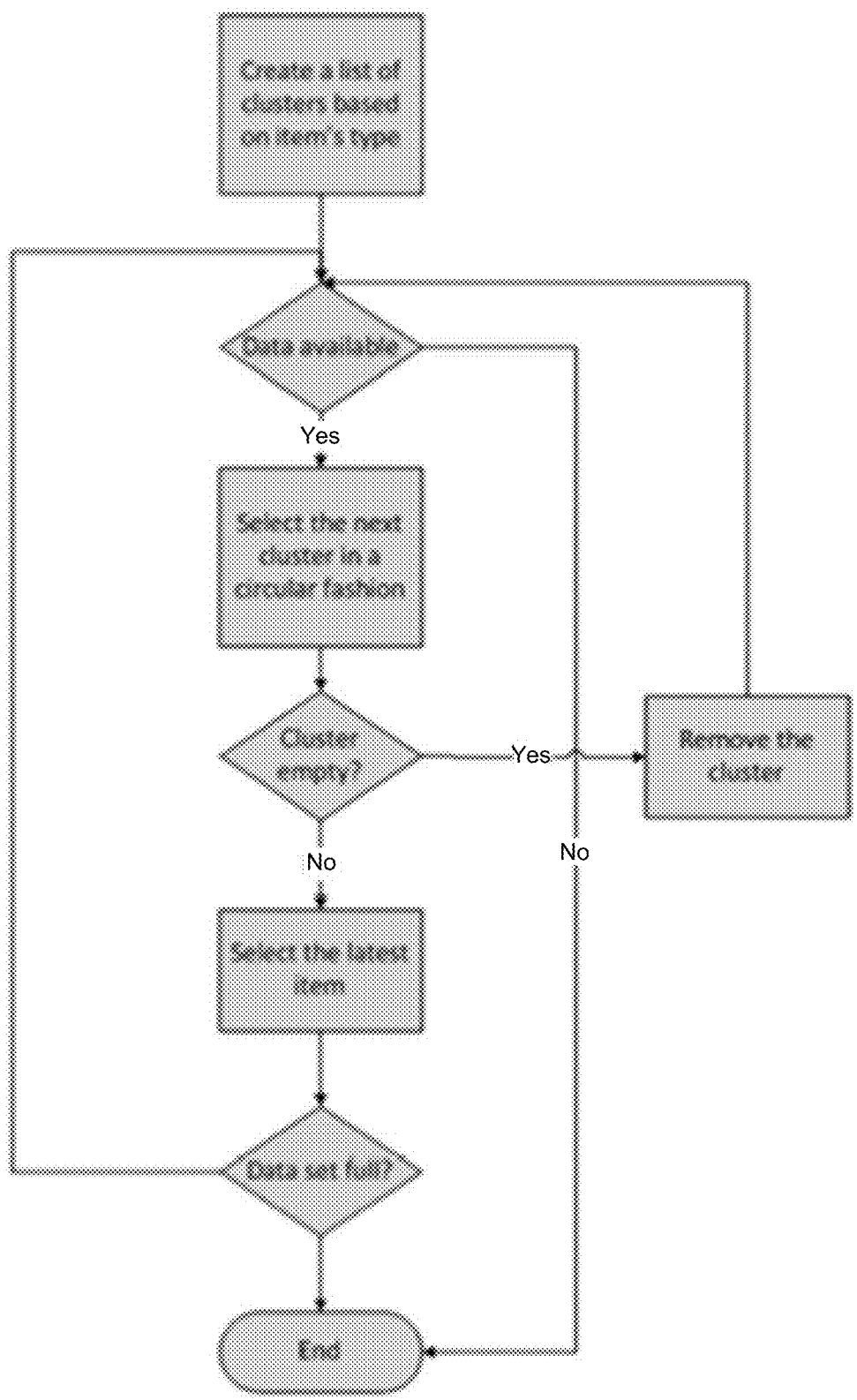
FIG. 13 illustrates a flowchart describing a sub process of the process shown in FIG. 12 for selection of relevant contact-related information items for presentation to the user according to an example embodiment of the present invention.

A flowchart illustrating a high-level process that may be used according to some example embodiments to select relevant contact-related information items for presentation to the user is shown in FIG. 12. In FIG. 12, relevance levels of high, medium, and low are used. A sub process for selecting relevant contact-related information items for presentation to the user is shown in FIG. 13. For example, each "select item" box in FIG. 12 may represent a series of tasks that are to be performed to complete a "select item" step of the process of FIG. 12. An example of such a series of tasks is illustrated in the sub process of FIG. 13. Accordingly, in FIG. 12, each "select item" sub process may step through contact-related information items having the same relevance (e.g., via the sub process of FIG. 13, in which a "cluster" refers to a group of contact-related information items having the same relevance level). Thus, in this example, high relevance items may be selected first by performing the FIG. 13 sub process with respect to high relevance items. Next, to select medium relevance items (if needed), the FIG. 13 sub process may be performed with respect to medium relevance items. If still needed, low relevance items may be selected by performing the FIG. 13 sub process with respect to low relevance items.

Figure 15:
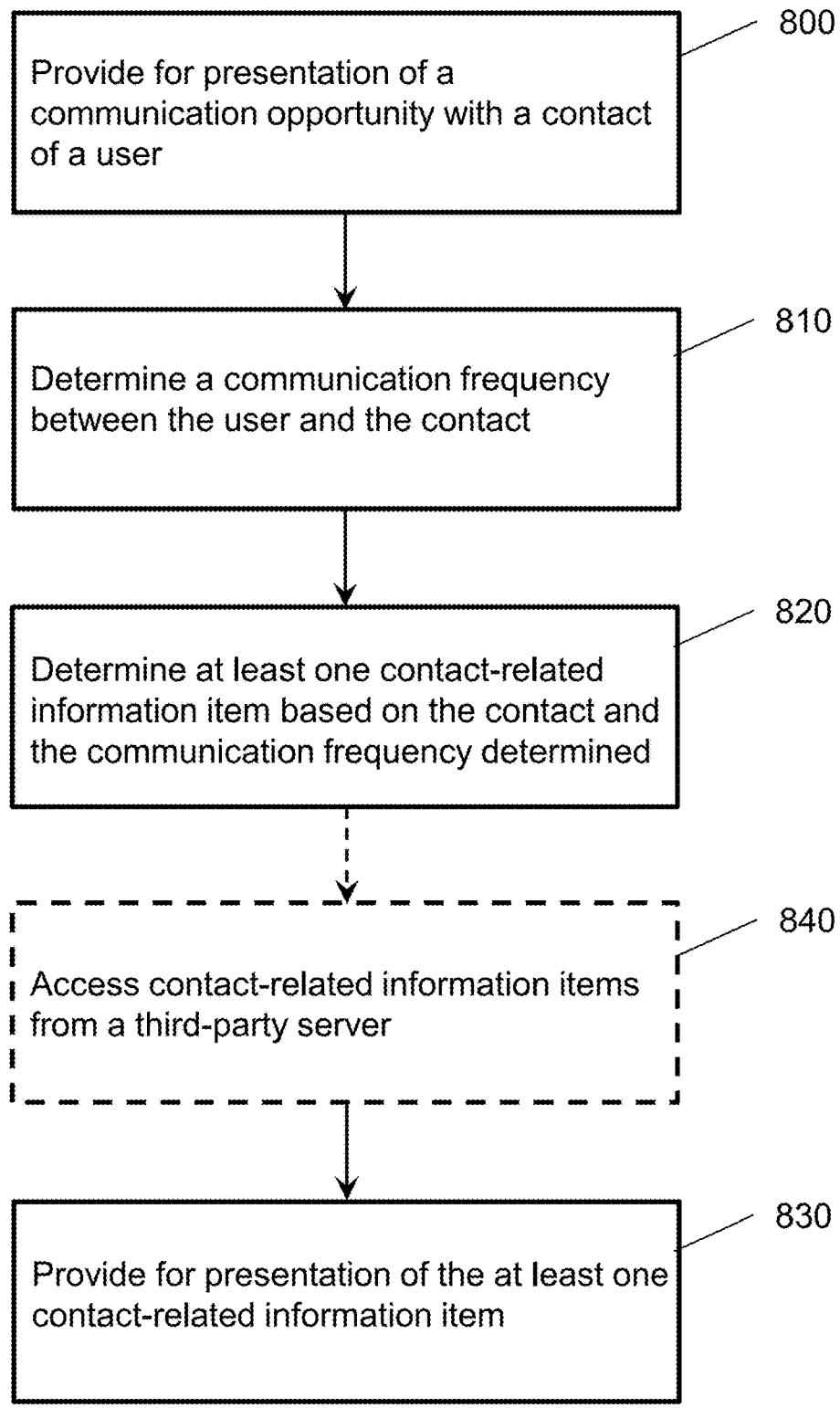
Figure 16:
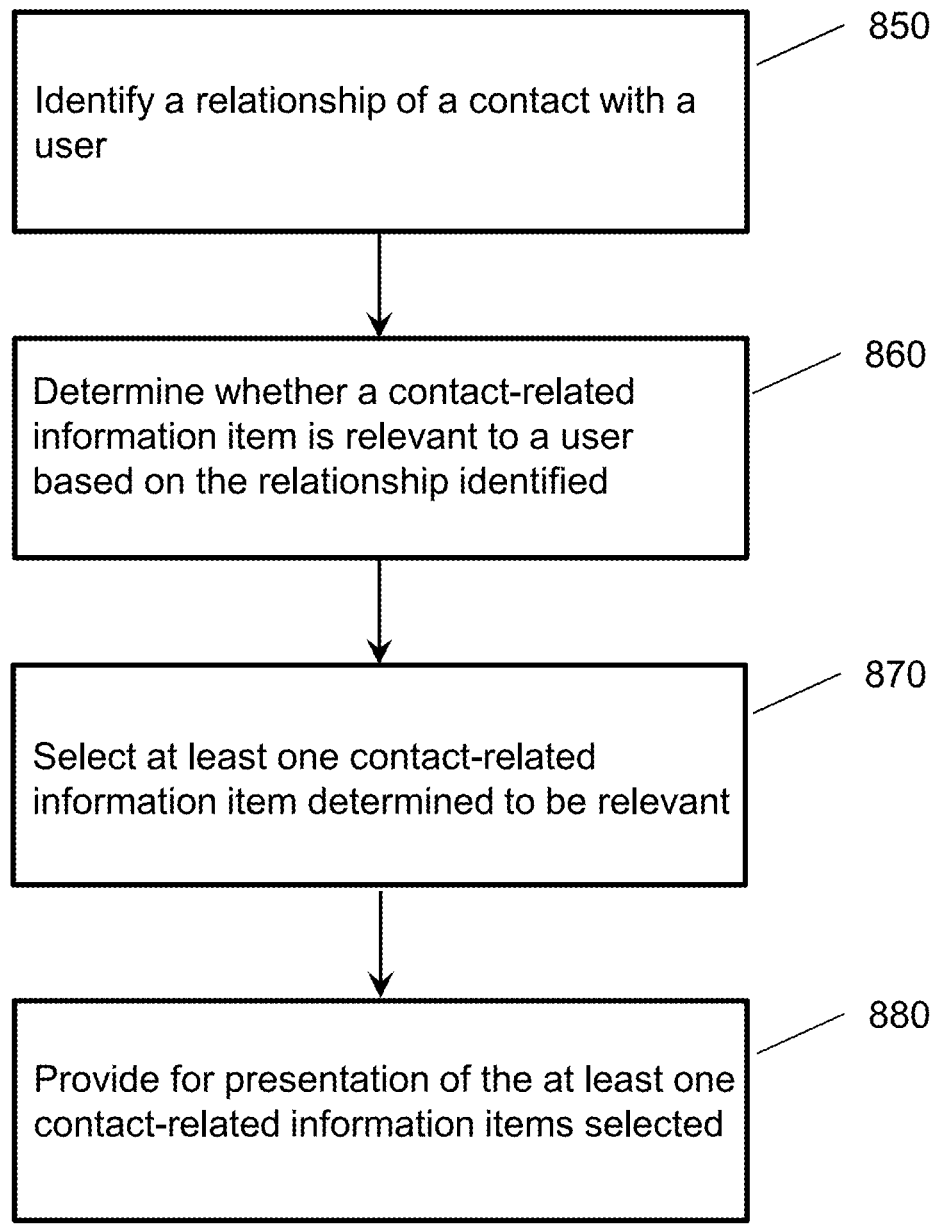

The following are examples of important events that a contact may experience and their effects on the user interface (e.g., how the contact-related information items may be presented to the user):

1. Job change
The apparatus will check the sources to detect changes to the job tile and company.
Example: Pete is now a Producer at Nokia
Relevance on profile: High
Relevance on overview: High
Expires: After a week since the last communication
Notifications: For Very Important Contacts (VICs) only
2. Relationship change
The apparatus will check the sources to detect if the relationship status changed.
Example: Jesse is single. Mike is married to Ana
Relevance on profile: High
Relevance on overview: High
Expires: After a week since the last communication
Notifications: For VICs only
3. Relocation
The home address has been changed
Example: Tom now lives in Kansas City
Relevance on profile: High
Relevance on overview: High
Expires: After a week since the last communication
Notifications: For VICs only
4. Birthday
Example: John has a birthday
Relevance on profile: High
Relevance on overview: High for VICs, Medium for rest
Expires: After 3 days or 24 hours after the last communication
Notifications: For VICs only
5. Traveled to your city
A contact has traveled from your city and now would be a good time to catch up.
Example: Brian is in Berlin
Relevance on profile: High
Relevance on overview: VICs only
Expires: As soon as a new location is detected
Notifications: For VICs only
6. Profile changes
A contact has made changes to his profile like (e.g., religion, favorite quote)
Example: The sky is the limit
Relevance on profile: High
Relevance on overview: None
Expires: After a week since the last communication
Notifications: For pinned contacts only
7. Anniversary
It's an anniversary, don't disturb us today☺
Example: Today is Jesse's anniversary
Relevance on profile: High
Relevance on overview: None
Expires: After 24 hours
Notifications: For pinned contacts only -continued 8. Recent calls
Example: Last call on Tuesday
Relevance on profile: High
Relevance on overview: None
Expires: After a week or a new call
Notifications: None
9. Recent SMSs
Example: Meet you at the coffee shop on the corner
Relevance on profile: High
Relevance on overview: None
Expires: After a week or a new SMS
Notifications: None
10. Recent Emails
Show recent emails because you might need context for a call.
Example: Meeting agenda
Relevance on profile: High
Relevance on overview: None
Expires: After a week or a new email
Notifications: None
11. Traveling
Pete travelled to London, now is not a good time to call him. Send him an email
Example: Pete is in London
Relevance on profile: High
Relevance on overview: Medium
Expires: When his location expires
Notifications: None
12. Upcoming birthday (within 2 weeks)
Someone's birthday is coming up, time to buy a present?
Example: Has birthday in 1 week
Relevance on profile: High
Relevance on overview: None
Expires: One day before the birthday (see birthday)
Notifications: None
13. Forecast for/current exceptional weather
A tornado is coming to Kansas City, call Dorothy
Example: Tornado alert!
Relevance on profile: Medium
Relevance on overview: None
Expires: After the rain☺
Notifications: None
14. Images where both user and contact are tagged
Example: You & Jessica were tagged in this picture
Relevance on profile: High
Relevance on overview: High
Expires: In a week after the last communication
Notifications: For VICs only
15. Significant stock price change
Shown when the contact's company stock falls/rises sharply, monthly over 5%, daily over 2%
Example: Company stock price increased over 2%
Relevance on profile: Medium
Relevance on overview: None
Expires: When the daily change normalizes < 2%
Notifications: None
16. Posted images
Shown when a contact posts a new image
Example: Simon posted
Relevance on profile: Normal or High when the user is tagged
Relevance on overview: Normal
Expires: When a new image is posted or within a week
Notifications: For VICs only
17. Nearby
A contact just checked in nearby (2 km from user's location)
Example: Simon just checked in at Crazy Horse
Relevance on profile: Normal
Relevance on overview: Normal
Expires: After 3 hours
Notifications: For VICs only
18. Status update
A contact just posted a status update on a social network
Example: Got myself a new cell phone
Relevance on profile: Normal, High for LinkedIn
Relevance on overview: Normal
Expires: After a new status update
Notifications: For VICs only
19. Check-in
A contact checked into a venue
Example: Boris checked in at Leon Snack & Coffee Shop -continued Relevance on profile: Normal
Relevance on overview: Normal
Expires: At most 3 are shown at a time
Notifications: For VICs only
20. Tweets
Example: It's Friday, let's grab a pint
Relevance on profile: Normal
Relevance on overview: Normal
Expires: After 3 hours
Notifications: For VICs only FIGS. 14, 15, and 16 illustrate flowcharts of systems, methods, and computer program products according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device of an apparatus employing an example embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus implements the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions, and program instruction means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Figure 14A:
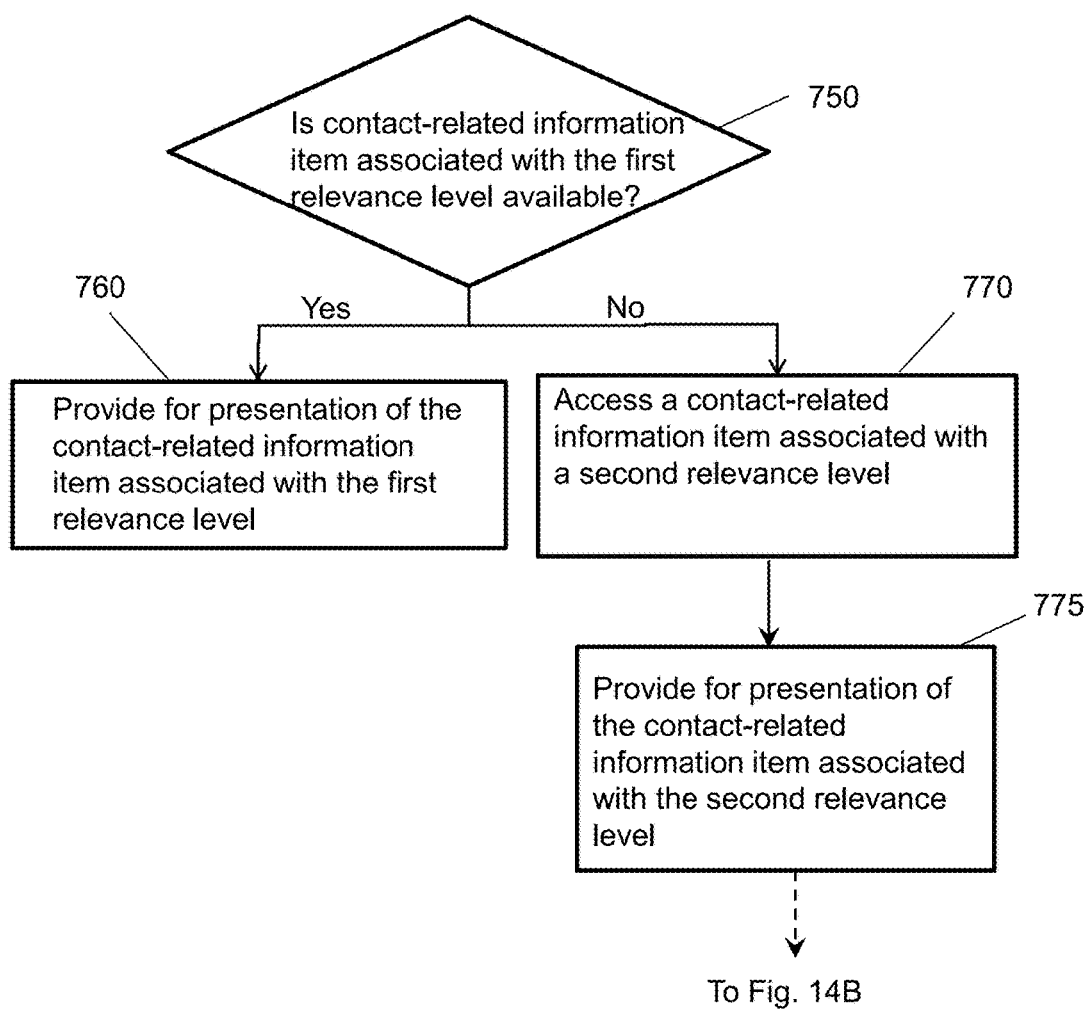
FIGS. 14A-16 illustrate flowcharts of methods of providing contact-related information items according to example embodiments of the present invention.
Figure 14B:
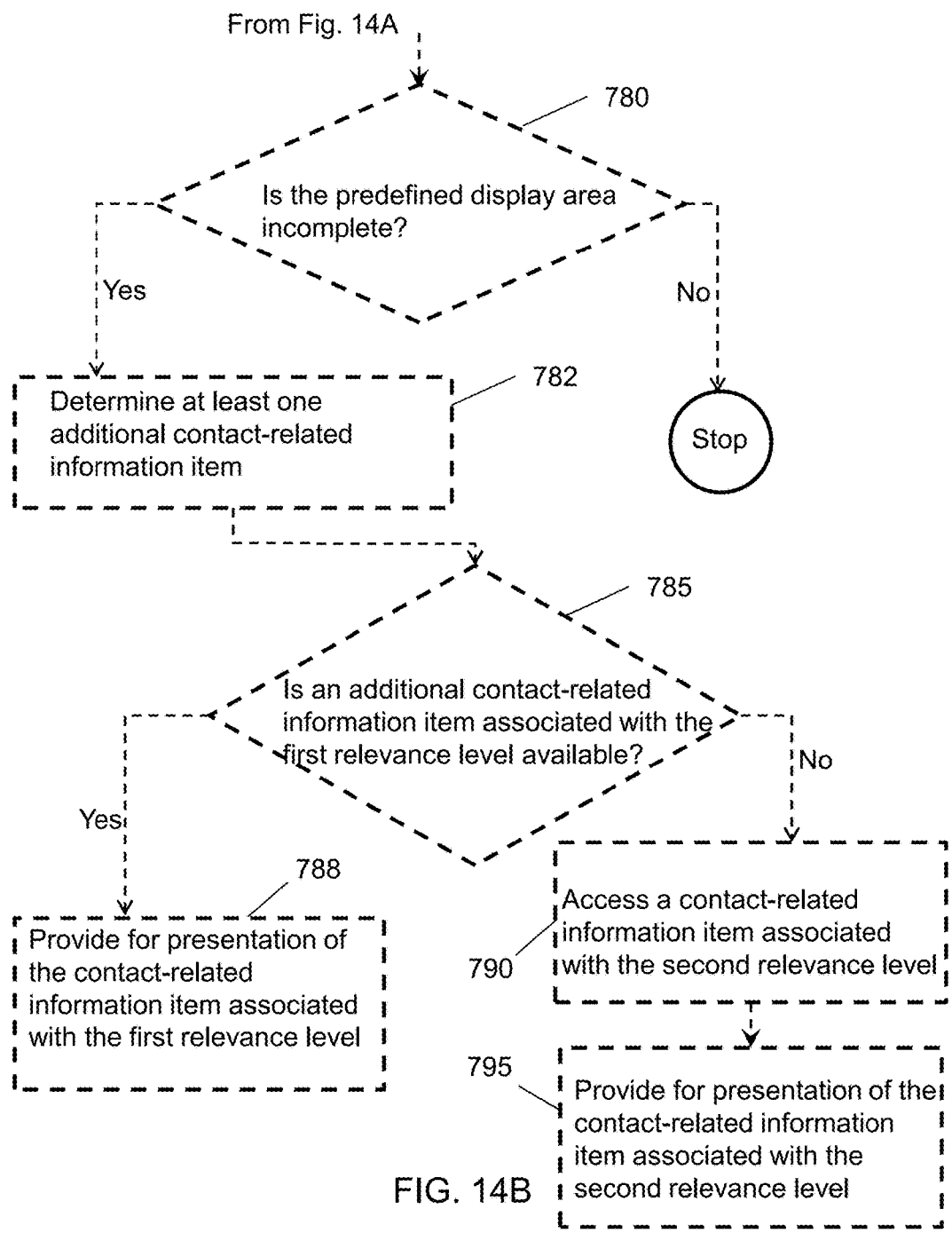

In this regard, one example embodiment of a method for selecting contact-related information items for presentation to a user is shown in FIGS. 14A and 14B. FIGS. 14A and 14B depict an example embodiment of a method for providing relevant contact-related information items that includes determining whether a contact-related information item associated with a first relevance level is available at block 750. In an instance in which the contact-related information item associated with the first relevance level is available, presentation of the contact-related information item associated with the first relevance level is provided for at block 760. In an instance in which the contact-related information item associated with the first relevance level is unavailable, a contact-related information item associated with a second relevance level is accessed at block 770, and presentation of the contact-related information item associated with the second relevance level is provided for at block 775, where the second relevance level is lower than the first relevance level.

In some example embodiments, at least one of the first relevance level or the second relevance level is predefined, as described above. At least one of the first relevance level or the second relevance level may, for example, be based at least in part on input provided by the user or input provided by the contact. In addition or alternatively, the contact-related information item associated with the first relevance level may comprise contact-specific data.

In some cases, providing for presentation of the contact-related information item may comprise displaying the contact-related information item within a predefined display area associated with a communication opportunity. In an instance in which the predefined display area is incomplete (block 780), the method of FIGS. 14A and 14B may further include determining at least one additional contact-related information item at block 782. In an instance in which an additional contact-related information item associated with the first relevance level is available (block 785), presentation of the contact-related information item associated with the first relevance level within the predefined area may be provided for at block 788. In an instance in which an additional contact-related information item associated with the first relevance level is unavailable, a contact-related information item associated with the second relevance level may be accessed at block 790, and presentation of the contact-related information item associated with the second relevance level within the predefined area may be provided for at block 795.

In some example embodiments, the determination of whether a contact-related information item associated with the first relevance level is available may be made in response to at least one of receipt of an incoming communication opportunity associated with the contact or receipt of a user request.

FIG. 15 illustrates an example embodiment of a method for providing contact-related information items based on a communication frequency. The depicted method of FIG. 15 includes providing for presentation of a communication opportunity with a contact of a user at block 800, determining a communication frequency between the user and the contact at block 810, and determining at least one contact-related information item based on the contact and the communication frequency determined at block 820. Furthermore, presentation of the at least one contact-related information item is provided for at block 830, such that the at least one contact-related information item is accessible to the user in a communication session with the contact (e.g., before, during, and/or after the communication session).

As described above, in some cases, the communication opportunity may comprise at least one of an incoming communication opportunity, an outgoing communication opportunity, or a contact profile. Moreover, determining a communication frequency at block 810 may include determining a length of time between a most recent communication session with the contact and a current communication opportunity, determining a total number of communication sessions with the contact over a predetermined period of time, determining a total communication time with the contact over a predetermined period of time, or a combination of these. Determining a communication frequency, in some embodiments, may include considering communications comprising at least two categories selected from the group consisting of voice calls, text messages, instant messages, e-mails, and social media messages.

In some example embodiments, contact-related information items may be accessed from a third-party server at block 840, such as a social media server, a local news server, a national news server, a weather server, etc., as described above. The contact-related information items may, in some example embodiments, comprise at least one item selected from the group consisting of user-inputted data, contact-inputted data, and location-based data.

In FIG. 16, an example embodiment of a method for providing relevant contact-related information items based on a relationship between a user and the user's contact is shown in which a relationship of a contact with a user is identified at block 850. A determination is made at block 860 of whether a contact-related information item is relevant to a user based on the relationship identified, and at least one contact-related information item determined to be relevant is selected at block 870. Presentation of the at least one of the contact-related information items selected is provided for at block 880.

As described above, the relationship of the contact with the user may be user-defined in some cases, and in other cases the relationship of the contact with the user may be determined based on a context of at least one previous communication between the user and the contact. Moreover, presentation of the at least one contact-related information item selected may be provided for in response to receipt of an incoming communication opportunity or receipt of a user request.

In some example embodiments, the relationship may comprise at least one of a relationship type or a relationship strength. Additionally or alternatively, contact-related information items determined to be relevant may comprise a subset of contact-related information items accessible to the user. Furthermore, as described above, presentation of the at least one contact-related information item selected may occur during a communication session between the user and the contact.

In some embodiments, certain ones of the operations above may be modified or further amplified as described below. Furthermore, in some embodiments, additional optional operations may be included, some examples of which are shown in dashed lines in FIGS. 14A-16. Modifications, additions, or amplifications to the operations above may be performed in any order and in any combination.

In an example embodiment, an apparatus for performing the methods of FIGS. 14A-16 above may comprise a processor (e.g., the processor 70 of FIG. 2) configured to perform some or each of the operations (750-830) described above. The processor may, for example, be configured to perform the operations (750-830) by performing hardware implemented logical functions, executing stored instructions, or executing algorithms for performing each of the operations. Alternatively, the apparatus may comprise means for performing each of the operations described above. In this regard, according to an example embodiment, examples of means for performing at least portions of operations 750, 770, 782, 790, 810, 820, 840, 850, and 860 may comprise, for example, the communication interface 74, the processor 70, the memory device 76, and/or a device or circuit for executing instructions or executing an algorithm for processing information as described above. Examples of means for performing operation 800 may comprise, for example, the user interface transceiver 72, the communication interface 74, the processor 70, and/or a device or circuit for executing instructions or executing an algorithm for processing information as described above. Examples of means for performing operations 760, 775, 780, 788, 795, 830, and 880 may comprise, for example, the user interface transceiver 72, the processor 70, and/or a device or circuit for executing instructions or executing an algorithm for processing information as described above. Examples of means for performing operations 785 and 870 may comprise, for example, the processor 70 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising at least one processor and at least one memory including computer program code, the at least one memory and the computer program code configured to, with the processor, cause the apparatus to:
  apply a ranking algorithm to contact-related information items associated with a contact of a user according to predefined categories of relevance, wherein the ranking algorithm comprises a weighting algorithm configured to arrange different types of contact-related information items into different predefined categories of relevance;
  determine whether a contact-related information item associated with a first relevance level based on the ranking algorithm is available;
  in response to an incoming voice call from the contact, provide for presentation of the contact-related information item associated with the first relevance level by displaying the contact-related information item within a predefined display area of a user interface in an instance in which the contact-related information item associated with the first relevance level is available and determine whether sufficient contact-related information items associated with the first relevance level are available to fill the predefined display area; and
  access, in response to the incoming voice call from the contact and also in response to a determination that the contact-related information items associated with the first relevance level that are available are insufficient to fill the predefined display area, a contact-related information item associated with a second relevance level based on the ranking algorithm and provide for presentation of the contact-related information item associated with the second relevance level by displaying the contact-related information item within the predefined display area of the user interface in an instance in which the contact-related information item associated with the first relevance level is unavailable, wherein the contact-related information items provide information relating to the contact of the user other than the contact's name and other than the contact's phone number, wherein the second relevance level is indicative of a lower level of importance of the contact-related information item in terms of contextual relevance as compared to the first relevance level and with respect to the contact, and wherein at least one of the first relevance level or the second relevance level is based at least in part on input provided by the user or by the contact.

2. The apparatus of claim 1, wherein at least one of the first relevance level or the second relevance level is predefined.

3. The apparatus of claim 1, wherein the contact-related information item associated with the first relevance level comprises contact-specific data.

4. The apparatus of claim 1, wherein, in an instance in which the predefined display area is incomplete, the at least one memory and the computer program code are further configured to, with the processor, cause the apparatus to determine at least one additional contact-related information item, wherein, in an instance in which an additional contact-related information item associated with the first relevance level is unavailable, the at least one memory and the computer program code are further configured to, with the processor, cause the apparatus to access a contact-related information item associated with the second relevance level and to provide for presentation of the contact-related information item associated with the second relevance level within the predefined area.

5. The apparatus of claim 1, wherein the at least one memory and the computer program code are further configured to, with the processor, cause the apparatus to determine whether a contact-related information item associated with the first relevance level is available in response to at least one of receipt of an incoming communication opportunity associated with the contact or receipt of a user request.

6. The apparatus of claim 1 wherein the contact-related information item associated with the second relevance level is displayed in a space in which the contact-related information item associated with the first relevance level would otherwise have been displayed if the contact-related information item associated with the first relevance level had been available.

7. A method comprising:

applying a ranking algorithm to contact-related information items associated with a contact of a user according to predefined categories of relevance, wherein the ranking algorithm comprises a weighting algorithm configured to arrange different types of contact-related information items into different predefined categories of relevance;

determining whether a contact-related information item associated with a first relevance level based on the ranking algorithm is available;

in response to an incoming voice call from the contact, providing for presentation of the contact-related information item associated with the first relevance level by displaying the contact-related information item within a predefined display area of a user interface in an instance in which the contact-related information item associated with the first relevance level is available and determining whether sufficient contact-related information items associated with the first relevance level are available to fill the predefined display area; and accessing, via a processor, in response to the incoming voice call from the contact and also in response to a determination that the contact-related information items associated with the first relevance level that are available are insufficient to fill the predefined display area, a contact-related information item associated with a second relevance level based on the ranking algorithm and providing for presentation of the contact-related information item associated with the second relevance level by displaying the contact-related information item within the predefined display area of the user interface in an instance in which the contact-related information item associated with the first relevance level is unavailable, wherein the contact-related information items provide information relating to the contact of the user other than the contact's name and other than the contact's phone number, wherein the second relevance level is indicative of a lower level of importance of the contact-related information item in terms of contextual relevance as compared to the first relevance level and with respect to the contact, and wherein at least one of the first relevance level or the second relevance level is based at least in part on input provided by the user or by the contact.

8. The method of claim 7, wherein at least one of the first relevance level or the second relevance level is predefined.

9. The method of claim 7, wherein the contact-related information item associated with the first relevance level comprises contact-specific data.

10. The method of claim 7, wherein, in an instance in which the predefined display area is incomplete, the method further comprises determining at least one additional contact-related information item, and wherein, in an instance in which an additional contact-related information item associated with the first relevance level is unavailable, the method further comprises accessing a contact-related information item associated with the second relevance level and providing for presentation of the contact-related information item associated with the second relevance level within the predefined area.

11. The method of claim 7 further comprising determining whether a contact-related information item associated with the first relevance level is available in response to at least one of receipt of an incoming communication opportunity associated with the contact or receipt of a user request.

12. The method of claim 7 wherein the contact-related information item associated with the second relevance level is displayed in a space in which the contact-related information item associated with the first relevance level would otherwise have been displayed if the contact-related information item associated with the first relevance level had been available.

13. A computer program product comprising at least one non-transitory computer-readable storage medium having computer-executable program code portions stored therein, the computer-executable program code portions comprising program code instructions for:

applying a ranking algorithm to contact-related information items according to predefined categories of relevance, wherein the ranking algorithm comprises a weighting algorithm configured to arrange different types of contact-related information items into different predefined categories of relevance;

determining whether a contact-related information item associated with a first relevance level based on the ranking algorithm is available;

in response to an incoming voice call from the contact, providing for presentation of the contact-related information item associated with the first relevance level by displaying the contact-related information item within a predefined display area of a user interface in an instance in which the contact-related information item associated with the first relevance level is available and determining whether sufficient contact-related information items associated with the first relevance level are available to fill the predefined display area; and accessing, in response to the incoming voice call from the contact and also in response to a determination that the contact-related information items associated with the first relevance level that are available are insufficient to fill the predefined display area, a contact-related information item associated with a second relevance level based on the ranking algorithm and providing for presentation of the contact-related information item associated with the second relevance level by displaying the contact-related information item within the predefined display area of the user interface in an instance in which the contact-related information item associated with the first relevance level is unavailable, wherein the contact-related information items provide information relating to the contact of the user other than the contact's name and other than the contact's phone number, wherein the second relevance level is indicative of a lower level of importance of the contact-related information item in terms of contextual relevance as compared to the first relevance level and with respect to the contact, and wherein at least one of the first relevance level or the second relevance level is based at least in part on input provided by the user or by the contact.

14. The computer program product of claim 13, wherein, in an instance in which the predefined display area is incomplete, the computer program portions are further configured for determining at least one additional contact-related information item, and wherein, in an instance in which an additional contact-related information item associated with the first relevance level is unavailable, the computer program portions are further configured for accessing a contact-related information item associated with the second relevance level and providing for presentation of the contact-related information item associated with the second relevance level within the predefined area.

15. The computer program product of claim 13 further comprising computer program portions are further configured for determining whether a contact-related information item associated with the first relevance level is available in response to at least one of receipt of an incoming communication opportunity associated with the contact or receipt of a user request.

16. The computer program product of claim 13, wherein at least one of the first relevance level or the second relevance level is predefined.

17. The computer program product of claim 13 wherein the contact-related information item associated with the second relevance level is displayed in a space in which the contact-related information item associated with the first relevance level would otherwise have been displayed if the contact-related information item associated with the first relevance level had been available.

* * * * *

UNITED STATES PATENT AND TRADEMARK OFFICE
CERTIFICATE OF CORRECTION

PATENT NO. : 10,255,327 B2  
APPLICATION NO. : 13/774748  
DATED : April 9, 2019  
INVENTOR(S) : Kuramura et al.

Page 1 of 1

It is certified that error appears in the above-identified patent and that said Letters Patent is hereby corrected as shown below:

On the Title Page

Item (73) Assignee, should read "Assignee: NOKIA TECHNOLOGIES OY, Espoo (FI)"

Signed and Sealed this  
Twenty-sixth Day of November, 2019

Andrei Iancu  
*Director of the United States Patent and Trademark Office*